(12) United States Patent
Kakiuchi et al.

(10) Patent No.: US 7,018,695 B2
(45) Date of Patent: Mar. 28, 2006

(54) OPTICAL RECORDING MEDIUM

(75) Inventors: Hironori Kakiuchi, Tokyo (JP);
Hiroyasu Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 149 days.

(21) Appl. No.: 10/808,628

(22) Filed: Mar. 24, 2004

(65) Prior Publication Data
US 2004/0191685 A1 Sep. 30, 2004

(30) Foreign Application Priority Data
Mar. 28, 2003 (JP) ............................. 2003-090850

(51) Int. Cl.
*B32B 3/02* (2006.01)

(52) U.S. Cl. .................. 428/64.1; 428/64.4; 428/64.5; 430/270.12; 430/270.13

(58) Field of Classification Search ............... 428/64.4; 430/270.12
See application file for complete search history.

(56) References Cited

U.S. PATENT DOCUMENTS

| | | | |
|---|---|---|---|
| 6,278,680 B1 * | 8/2001 | Miyauchi et al. ...... | 369/112.01 |
| 6,416,837 B1 * | 7/2002 | Kojima et al. ............. | 428/64.1 |
| 6,660,451 B1 * | 12/2003 | Sakaue et al. ......... | 430/270.13 |
| 6,670,014 B1 * | 12/2003 | Nishihara et al. .......... | 428/64.1 |
| 2004/0152016 A1 * | 8/2004 | Mishima et al. ....... | 430/270.12 |
| 2005/0047305 A1 * | 3/2005 | Inoue et al. ................... | 369/94 |

FOREIGN PATENT DOCUMENTS

| | | | |
|---|---|---|---|
| JP | 62-204442 | | 9/1987 |
| JP | 2003-260874 | * | 9/2003 |
| JP | 2003-326848 | * | 11/2003 |

* cited by examiner

*Primary Examiner*—Elizabeth Mulvaney
(74) *Attorney, Agent, or Firm*—Seed IP Law Group PLLC

(57) ABSTRACT

An optical recording medium includes a substrate and a recording layer in which data can be recorded by projecting a laser beam thereonto, the recording layer including a first recording film containing an element selected from the group consisting of Si, Ge, C, Sn, Au, Zn and Cu as a primary component and a second recording film containing Cu as a primary component.

The thus constituted optical recording medium has an excellent initial recording characteristic and can store recorded data in a good condition over the long term.

24 Claims, 14 Drawing Sheets

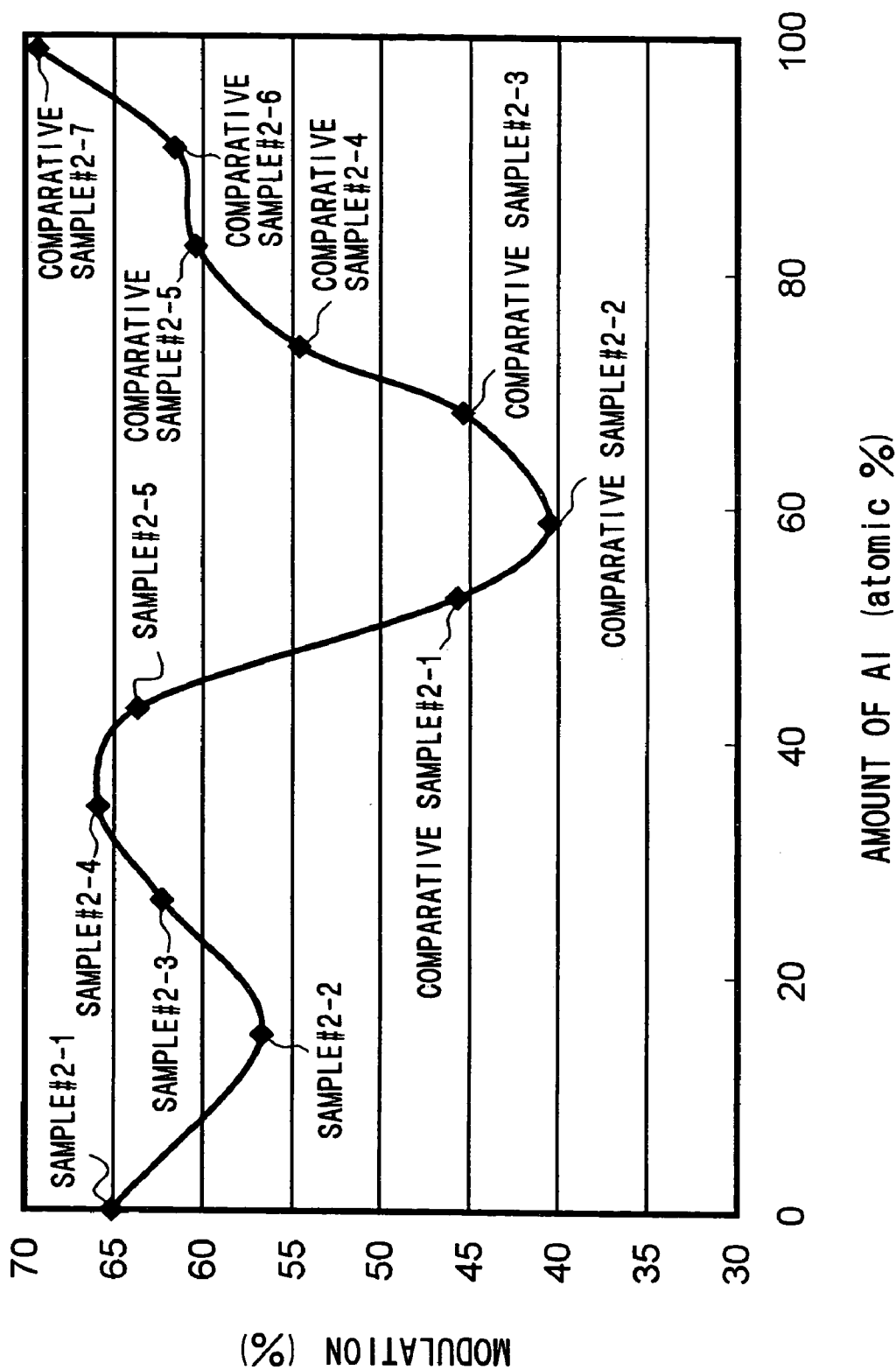

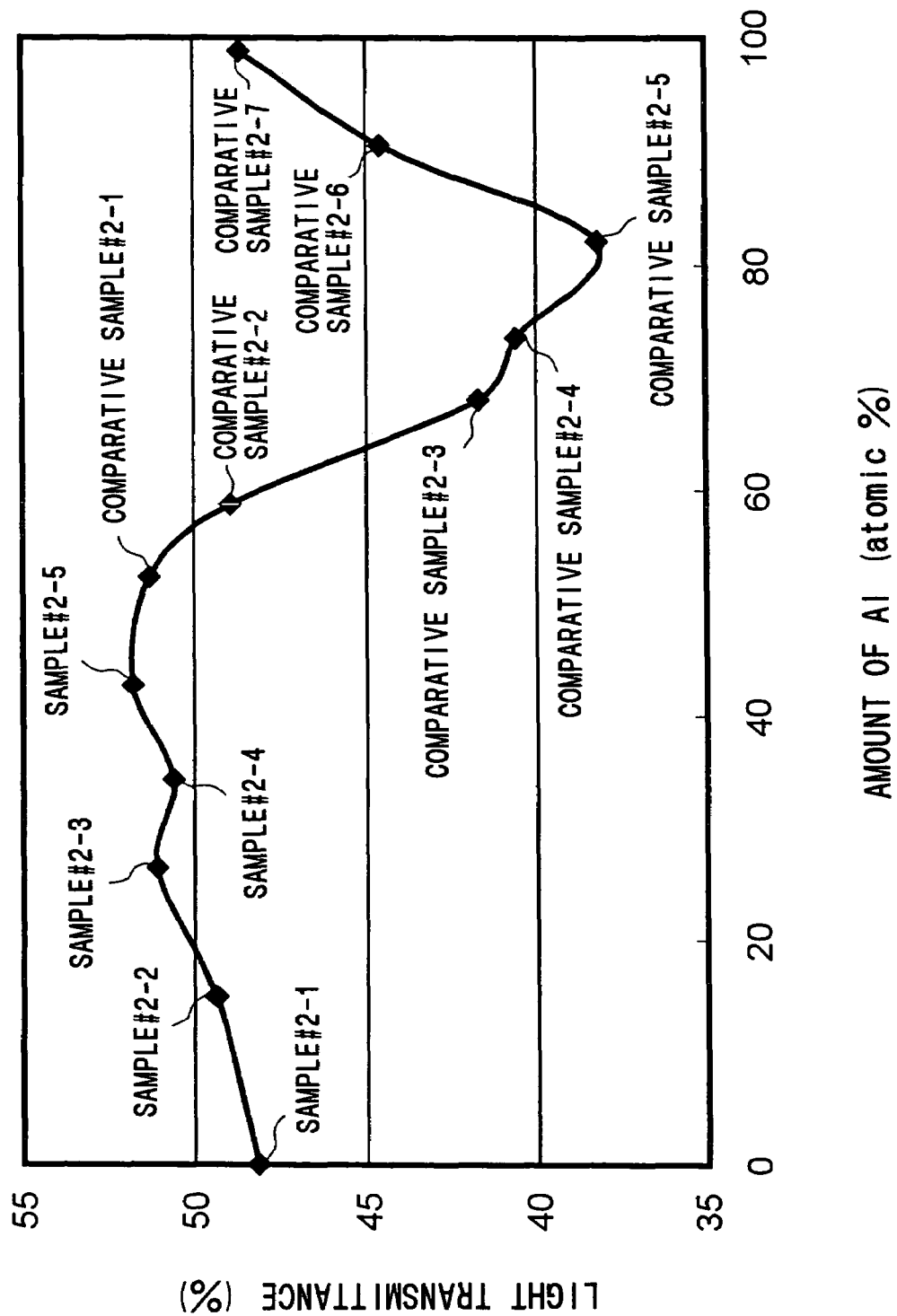

OPTICAL RECORDING MEDIUM

BACKGROUND OF THE INVENTION

The present invention relates to an optical recording medium and, particularly, to an optical recording medium which has an excellent initial recording characteristic and can store recorded data in a good condition over the long term.

DESCRIPTION OF THE PRIOR ART

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

As well known in the art, data are generally recorded in a ROM type optical recording medium using prepits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine dye, phthalocyanine dye or azo dye is generally used as the material of the recording layer and data are recorded utilizing changes in an optical characteristic caused by chemical change of the organic dye, which change may be accompanied by physical deformation.

Unlike data recorded in a data rewritable type optical recording medium, data recorded in a write-once type optical recording medium cannot be erased and rewritten. This means that data recorded in a write-once type optical recording medium cannot be falsified, so that the write-once type optical recording medium is useful in the case where it is necessary to prevent data recorded in an optical recording medium from being falsified.

However, since an organic dye is degraded when exposed to sunlight or the like, desirable for improving long-time storage reliability of the write-once type optical recording medium to form the recording layer of a material other than an organic dye.

As disclosed in Japanese Patent Application Laid Open No. 62-204442, an optical recording medium including two recording layers formed of inorganic materials is known as an example of an optical recording medium whose recording layer is formed of a material other than an organic dye.

However, in the optical recording medium disclosed in Japanese Patent Application Laid Open No. 62-204442, it is difficult to store the initially recorded data in the recording layers in a good condition over the long term and since the surface smoothness of the recording layer is not necessarily good, the initial recording characteristic may be poor.

SUMMARY OF THE INVENTION

It is therefore an object of the present invention to provide an optical recording medium which has an excellent initial recording characteristic and can store recorded data in a good condition over the long term.

The inventors of the present invention vigorously pursued a study for accomplishing the above object and, as a result, made the discovery that when a laser beam is used to record data in a recording layer composed of a first recording film containing an element selected from the group consisting of Si, Ge, C, Sn, Au, Zn and Cu as a primary component and a second recording film containing Ti as a primary component, a record mark is formed by mixing both the primary component element of the first recording film and the primary component element of the second recording film to markedly change the reflection coefficient thereof and enable data to be recorded with high sensitivity. They the further discovered that data initially recorded with high sensitivity in the optical recording medium can be stored for a long time by utilizing the large difference in reflection coefficient between the region of the record mark including the primary component element of the first recording film and the primary component element of the second recording film, and the other regions and that jitter of a reproduced signal can be markedly decreased.

The present invention is based on this finding and according to the present invention, the above and other objects of the present invention can be accomplished by an optical recording medium comprising a substrate and a recording layer in which data can be recorded by projecting a laser beam thereonto, the recording layer including a first recording film containing an element selected from the group consisting of Si, Ge, C, Sn, Au, Zn and Cu as a primary component and a second recording film containing Ti as a primary component.

In the present invention, the statement that the first recording film contains a certain element as a primary component means that the content of the element is maximum among the elements contained in the first recording film, while the statement that the second recording film contains Ti as a primary component means that the content of Ti is maximum among the elements contained in the second recording film.

In the present invention, it is not absolutely necessary for the second recording film to be in contact with the first recording film and it is sufficient for the second recording film to be so located in the vicinity of the first recording film as to enable formation of a mixed region including the primary component element of the first recording film and the primary component element of the second recording film, thereby forming a record mark when the region is irradiated with a laser beam. Further, one or more other layers such as a dielectric layer may be interposed between the first recording film and the second recording film.

In the present invention, it is preferable to form the second recording film so as to be in contact with the first recording film.

Although the reason why a mixed region including the primary component element of the first recording film and the primary component element of the second recording film can be formed, thereby forming a record mark when irradiated with a laser beam is not altogether clear, it is reasonable to conclude that the primary component elements of the first and second recording films are partially or totally fused or diffused, thereby forming a region where the primary component elements of the first and second recording films mix.

The reflection coefficient that the record mark thus formed by mixing the primary component elements of the first and second recording films exhibits with respect to a laser beam for reproducing information and the reflection coefficient that other regions exhibit with respect to the laser beam for reproducing information are considerably different and, therefore, recorded information can be reproduced with high sensitivity by utilizing such large difference in the reflection coefficients.

In a preferred aspect of the present invention, the second recording film contains Al as an additive.

According to this preferred aspect of the present invention, it is possible to reduce jitter of a reproduced signal.

In a further preferred aspect of the present invention, the second recording film contains Al as an additive in an amount equal to or more than 25 atomic % and less than 50 atomic %.

According to this preferred aspect of the present invention, it is possible to not only reduce jitter of a reproduced signal but also obtain high modulation.

In the present invention, it is preferable for the second recording film to contain no element other than Ti and Al and unavoidable impurities.

In a preferred aspect of the present invention, the optical recording medium further comprises a first dielectric layer and a second dielectric layer on opposite sides of the recording layer.

In a preferred aspect of the present invention, the optical recording medium further comprises a light transmission layer having a thickness of 10 to 300 μm on the opposite side to the substrate with respect to the recording layer and one surface of the light transmission layer constitutes a light incidence plane through which the laser beam enters the optical recording medium.

In the present invention, a laser beam preferably has a wavelength of 380 nm to 450 nm in order to obtain high modulation.

The above and other objects of the present invention can be also accomplished by an optical recording medium comprising a substrate and a plurality of information recording layers in which data can be recorded by projecting a laser beam thereonto, at least one information recording layer other than a information recording layer farthest from a light incidence plane through which a laser beam enters including a first recording film containing an element selected from the group consisting of Si, Ge, C, Sn, Au, Zn and Cu as a primary component and a second recording film containing Ti as a primary component.

According to the present invention, when a laser beam is used to record data in the at least one information recording other than a information recording layer farthest from the light incidence plane, since the element contained in the first recording film as a primary component and the element contained in the second recording film as a primary component are mixed to form a record mark and the reflection coefficient of the record mark is greatly different from those of regions where no record mark is formed, data can be recorded in the at least one information recording other than a information recording layer farthest from the light incidence plane with high sensitivity and data initially recorded with high sensitivity in the optical recording medium can be stored for a long time. Further, jitter of a reproduced signal can be markedly decreased.

Further, in the case of recording data in a farthest information recording layer from the light incidence plane and reproducing data from the farthest information recording layer, the amount of a laser beam projected onto the farthest information recording layer and the amount of the laser beam reflected by the farthest information recording layer and detected are influenced by information recording layers other than the farthest information recording layer. Accordingly, in the case where the light transmittance of a region of an information recording layer other than the farthest information recording layer where a record mark is formed and that of a blank region of the information recording layer other than the farthest information recording layer where no record mark is formed are greatly different from each other, when data are recorded in the farthest information recording layer and data recorded in the farthest information recording layer are reproduced by adjusting the focus of a laser beam on the farthest information recording layer and irradiating the farthest information recording layer with the laser beam, the amount of the laser beam projected onto the farthest information recording layer and the amount of the laser beam reflected by the farthest information recording layer and detected differ greatly depending upon whether the region of the information recording layer other than the farthest information recording layer through which the laser beam is projected is a region where a record mark is formed or a blank region. As a result, the recording characteristics of the farthest information recording layer and the amplitude of a signal reproduced from the farthest information recording layer change greatly depending upon whether the region of the information recording layer other than the farthest information recording layer through which the laser beam is projected is a region where a record mark is formed or a blank region. However, in a study done by the inventors of the present invention, it was found that when the at least one information recording layer was irradiated with a laser beam, the difference in light transmittances between a region where a record mark was formed by mixing, an element selected from the group consisting of Si, Ge, C, Sn, Au, Zn and Cu and contained in the first recording film as a primary component and Ti contained in the second recording film as a primary component, and a blank region was small, and therefore, in the case of recording data in the farthest information recording layer from the light incidence plane or reproducing data from the farthest information recording layer by projecting a laser beam onto the farthest information recording layer via the at least one information recording layer, even if a region of the recording layer through which the laser beam is transmitted contains a region where a record mark is formed and a blank region, it is possible to record data in the farthest information recording layer from the light incidence plane and reproduce data from the farthest recording layer in a desired manner.

In a preferred aspect of the present invention, the second recording film contains Al as an additive.

According to this preferred aspect of the present invention, it is possible to reduce jitter of a reproduced signal.

In a further preferred aspect of the present invention, the second recording film contains Al as an additive in an amount equal to or more than 25 atomic % and less than 50 atomic %.

According to this preferred aspect of the present invention, it is possible to not only reduce jitter of a reproduced signal but also obtain high modulation.

In the present invention, it is preferable for the second recording film to contain no element other than Ti and Al and unavoidable impurity.

In a preferred aspect of the present invention, an information recording layer(s) located on the side of the at least one information recording layer opposite from the side the light incidence plane is constituted so that data can be recorded in and data can be reproduced therefrom using a laser beam having a wavelength of 380 nm to 450 nm.

Since the difference in light transmittances between a region where a record mark is formed by mixing an element contained in the first recording film as a primary component and an element contained in the second recording film as a primary component and a blank region is particularly small with respect to a laser beam having a wavelength of 380 nm to 450 nm, according to this preferred aspect of the present invention, data can be recorded in and data can be reproduced from the information recording layer(s) located on the opposite side of the at least one information recording layer from the light incidence plane in a desired manner.

In a preferred aspect of the present invention, the optical recording medium further comprises a first dielectric layer and a second dielectric layer on opposite sides of the at least one recording layer.

In a preferred aspect of the present invention, the optical recording medium further comprises a light transmission layer having a thickness of 10 to 300 μm on the opposite side to the substrate with respect to the plurality of recording layers and one surface of the light transmission layer constitutes a light incidence plane through which the laser beam enters the optical recording medium.

The above and other objects and features of the present invention will become apparent from the following description made with reference to the accompanying drawings.

BRIEF DESCRIPTION OF THE DRAWINGS

FIG. 20 is a graph showing how modulation of each of optical recording medium samples #2-1 to #2-5 and optical recording medium comparative samples #2-1 to #2-7 varied with an amount of Al contained in a second recording film thereof.

FIG. 21 is a graph showing how light transmittance of each of optical recording medium samples #2-1 to #2-5 and optical recording medium comparative samples #2-1 to #2-7 varied with an amount of Al contained in a second recording film thereof.

DESCRIPTION OF THE PREFERRED EMBODIMENTS

Figure 1:
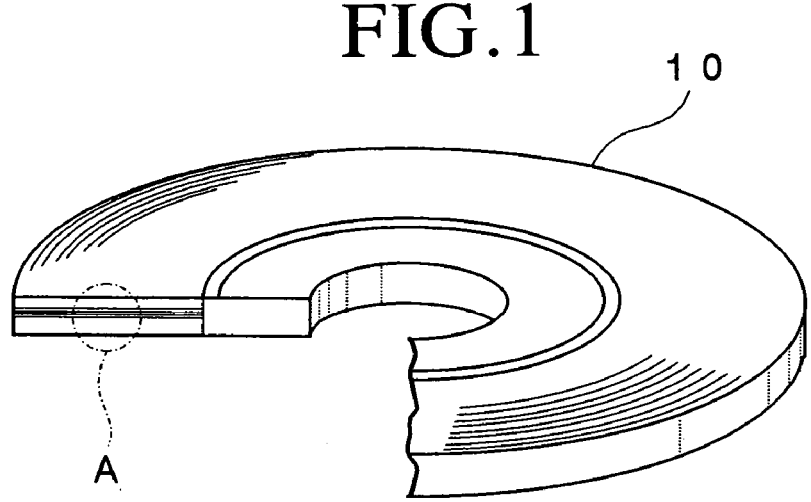
FIG. 1 is a schematic partially cutaway perspective view showing an optical recording medium that is a preferred embodiment of the present invention.
Figure 2:
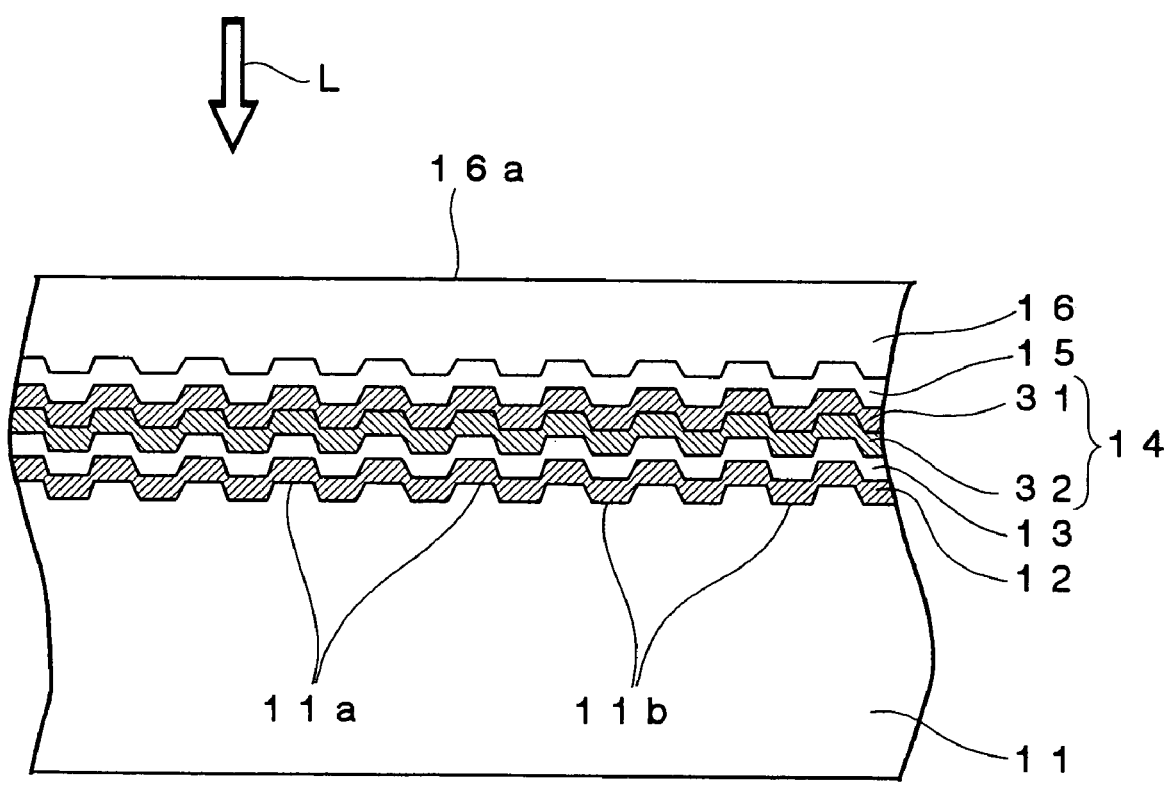
FIG. 2 is an enlarged schematic cross-sectional view of the part of the optical recording medium indicated by A in FIG. 1.

FIG. 1 is a schematic partially cut perspective view showing an optical recording medium that is a preferred embodiment of the present invention and FIG. 2 is a schematic enlarged cross-sectional view indicated by A in FIG. 1.

As shown in FIG. 1, an optical recording medium 10 according to this embodiment is formed disk-like and has an outer diameter of about 120 mm and a thickness of about 1.2 mm.

An optical recording medium 10 according to this embodiment is constituted as a write-once type optical recording medium and as shown in FIG. 2, it includes a support substrate 11, a reflective layer 12 formed on the surface of the support substrate 11, a second dielectric layer 13 formed on the surface of the reflective layer 12, a recording layer 14 formed on the surface of the second dielectric layer 13, a first dielectric layer 15 formed on the surface of the recording layer 14 and a light transmission layer 16 formed on the surface of the first dielectric layer 15.

As shown in FIG. 2, the recording layer 14 is constituted by a second recording film 22 formed on the surface of the second dielectric layer 13 and a first recording film 21 formed on the surface of the second recording film 22.

In this embodiment, as shown in FIG. 2, a laser beam L having a wavelength of 380 nm to 450 nm is projected onto a light incidence plane 16a constituted by one surface of the light transmission layer 16, thereby recording data in the recording layer 14 of the optical recording medium 10 or reproducing data from the recording layer 14 of the optical recording medium 10.

The support substrate 11 serves as a support for ensuring mechanical strength and a thickness of about 1.2 mm required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and polyolefin resin are most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 16a located opposite to the support substrate 11, it is unnecessary for the support substrate 11 to have a light transmittance property.

As shown in FIG. 2, grooves 11a and lands 11b are alternately and spirally formed on the surface of the support substrate 11 so as to extend from a portion in the vicinity of the center of the support substrate 11 toward the outer circumference thereof or from the outer circumference of the support substrate 11 toward a portion in the vicinity of the center thereof. The grooves 11a and/or lands 11b serve as a guide track for the laser beam L.

The depth of the groove 11a is not particularly limited and is preferably set to 10 nm to 40 nm. The pitch of the grooves 11a is not particularly limited and is preferably set to 0.2 μm to 0.4 μm.

It is preferable to form the support substrate 11 by an injection molding process using a stamper but the support substrate 11 may be formed by any of various other processes such as a photo-polymer (2P) process.

The reflective layer 12 serves to reflect the laser beam L entering through the light transmission layer 16 so as to emit it from the light transmission layer 16.

The material used to form the reflective layer 12 is not particularly limited insofar as it can reflect a laser beam L, and the reflective layer 12 can be formed of Mg, Al, Ti, Cr, Fe, Co, Ni, Cu, Zn, Ge, Ag, Pt, Au and the like. Among these materials, it is preferable to form the reflective layer 12 of a metal material having a high reflection characteristic, such as Al, Au, Ag, Cu or alloy containing at least one of these metals, such as alloy of Ag and Cu.

The reflective layer 12 also serves to increase the difference in reflection coefficient between a recorded region and an unrecorded region by a multiple interference effect, thereby obtaining a higher reproduced signal (C/N ratio).

The thickness of the reflective layer 12 is not particularly limited but is preferably from 5 nm to 300 nm, more preferably from 20 nm to 200 nm.

In the case where the thickness of the reflective layer 12 is thinner than 5 nm, it is difficult to reflect a laser beam L in a desired manner. On the other hand, in the case where the thickness of the reflective layer 12 exceeds 300 nm, the surface smoothness of the reflective layer 12 becomes worse and it takes a longer time for forming the reflective layer 12, thereby lowering the productivity of the optical recording medium 10.

The first dielectric layer 15 and the second dielectric layer 13 serve to protect the recording layer 14. Degradation of recorded data can be prevented over a long period by the first dielectric layer 15 and the second dielectric layer 13.

The material for forming the first dielectric layer 15 and the second dielectric layer 13 is not particularly limited insofar as it is transparent in the wavelength range of the laser beam L and the first dielectric layer 15 and the second dielectric layer 13 can be formed of a dielectric material containing oxide, sulfide, nitride, carbide or a combination thereof, for example, as a primary component. In order to prevent the support substrate 11 from being deformed by heat and improve the characteristics of the first dielectric layer 15 and the second dielectric layer 13 for protecting the recording layer 14, it is preferable to form the first dielectric layer 15 and the second dielectric layer 13 of an oxide, sulfide, nitride or carbide of Al, Si, Ce, Ti, Zn, Ta or the like, such as $Al_2O_3$, AlN, ZnO, ZnS, GeN, GeCrN, CeO, $CeO_2$, SiO, $SiO_2$, $Si_3N_4$, SiC, $La_2O_3$, TaO, $TiO_2$, SiAlON (mixture of $SiO_2$, $Al_2O_3$, $Si_3N_4$ and AlN), LaSiON (mixture of $La_2O_3$, $SiO_2$ and $Si_3N$) or the like, or the mixture thereof and it is particularly preferable to form the first dielectric layer 15 and the second dielectric layer 13 of a mixture of ZnS and $SiO_2$. In the case of forming the first dielectric layer 15 and the second dielectric layer 13 of a mixture of ZnS and $SiO_2$, it is preferable for the mole ratio of ZnS to $SiO_2$ to be about 80:20.

The first dielectric layer 15 and the second dielectric layer 13 may be formed of the same dielectric material or of different dielectric materials. Moreover, at least one of the first dielectric layer 15 and the second dielectric layer 13 may have a multi-layered structure including a plurality of dielectric films.

The thickness of the first dielectric layer 15 and the second dielectric layer 13 is not particularly limited but is preferably from 3 nm to 200 nm. If the first dielectric layer 15 or the second dielectric layer 13 is thinner than 3 nm, it is difficult to obtain the above-described advantages. On the other hand, if the first dielectric layer 15 or the second dielectric layer 13 is thicker than 200 nm, it takes a long time to form the first dielectric layers 15 and the second dielectric layers 13, thereby lowering the productivity of the optical recording medium 10, and cracks may be generated in the first dielectric layers 15 and/or the second dielectric layers 13 owing to stress present in the first dielectric layers 15 and/or the second dielectric layer 13.

The first dielectric layer 15 and the second dielectric layer 13 also serve to increase the difference in optical properties of the optical recording medium 10 between before and after data recording and it is therefore preferable to form the first dielectric layer 15 and the second dielectric layer 13 of a material having a high refractive index n in the wavelength range of the laser beam L. Further, since the recording sensitivity becomes low as the energy absorbed in the first dielectric layer 15 and the second dielectric layer 13 becomes large when the laser beam L is projected onto the optical recording medium 10 and data are to be recorded therein, it is preferable to form the first dielectric layer 15 and the second dielectric layer 13 of a material having a low extinction coefficient k in the wavelength range of the laser beam L.

The recording layer 14 is adapted for recording data therein.

In this embodiment, the recording layer 14 is constituted by the first recording film 21 and the second recording film 22 and the first recording film 21 is disposed on the side of the light transmission layer 16 and the second recording film 22 is disposed on the side of the support substrate 11.

In this embodiment, the first recording film 21 contains Si as a primary component and the second recording film 22 contains Ti as a primary component.

Ti contained in the second recording film 22 as a primary component quickly mixes with the element contained in the first recording film 21 to form a record mark when irradiated with a laser beam L, thereby enabling data to be quickly recorded in the first recording film 21 and the second recording film 22.

In order to improve the recording sensitivity of the first recording film 21, one or more elements selected from a group consisting of Mg, Cu, Ag and Au may be further added to the first recording film 21 in addition to Si contained in the first recording film 21 as a primary component.

In order to reduce jitter of a reproduced signal, the second recording film 22 contains Al as an additive and it is more preferable for the second recording film 22 to be added with Al in an amount equal to or more than 25 atomic % and less than 50 atomic % since jitter of a reproduced signal can be reduced and high modulation can be achieved. It is preferable for the second recording film 22 not to contain any other element than Ti and Al, except when contained as an unavoidable impurity.

In a study done by the inventors of the present invention, it was found that in the case of forming a recording layer 14 of an optical recording medium 10 of a first recording film 21 containing Si as a primary component and a second recording film 22 containing Ti as a primary component and Al as an additive in an amount equal to or more than 25 atomic % and less than 50 atomic % and forming a record mark of a mixed region composed of Si contained in the first recording film 21 as a primary component and Ti contained in the second recording film 22 as a primary component in the recording layer 14, thereby recording data therein, it was possible to not only record data in the optical recording medium 10 with high sensitivity but also store data initially recorded with high sensitivity in the optical recording medium 10 for a long time.

Further, since each of Si, Ti and Al is one of the most commonplace elements on earth, the load put on the global environment can be lightened.

The surface smoothness of the first recording layer 31 irradiated with the laser beam L becomes worse as the total thickness of the first recording film 21 and the second recording film 22 becomes thicker. As a result, the noise level of the reproduced signal becomes higher and the recording sensitivity is lowered. On the other hand, in the case where the total thickness of the first recording film 21 and the second recording film 22 is too small, the change in reflection coefficient between before and after irradiation with the laser beam L is small, so that a reproduced signal having high strength (C/N ratio) cannot be obtained. Moreover, it becomes difficult to control the thickness of the first recording film 21 and the second recording film 22.

Therefore, in this embodiment, the first recording film 21 and the second recording film 22 are formed so that the total thickness thereof is from 2 nm to 40 nm. In order to obtain a reproduced signal having higher strength (C/N ratio) and further decrease the noise level of the reproduced signal, the total thickness of the first recording film 21 and the second recording film 22 is preferably from 2 nm to 20 nm and more preferably 2 nm to 15 nm.

The individual thicknesses of the first recording film 21 and the second recording film 22 are not particularly limited but in order to considerably improve the recording sensitivity and greatly increase the change in reflection coefficient between before and after irradiation with the laser beam L, the thickness of the first recording film 21 is preferably from 1 nm to 30 nm and the thickness of the second recording film 22 is preferably from 1 nm to 30 nm. Further, it is preferable to define the ratio of the thickness of the first recording film 21 to the thickness of the second recording film 22 (thickness of first recording film 21/thickness of second recording film 22) to be from 0.2 to 5.0.

Each of the reflective film 12, the second dielectric layer 13, the second recording film 22, the first recording film 21 and the first dielectric layer 15 can be formed by a vapor growth process using chemical species containing elements for forming it. Illustrative examples of the vapor growth processes include a sputtering process, vacuum deposition process and the like and the sputtering process is preferably used for forming them.

The light transmission layer 16 serves to transmit a laser beam L and preferably has a thickness of 10 μm to 300 μm. More preferably, the light transmission layer 16 has a thickness of 50 μm to 150 μm.

The material used to form the light transmission layer 16 is not particularly limited but in the case where the light transmission layer 16 is to be formed by the spin coating process or the like, ultraviolet ray curable resin, electron beam curable resin or the like is preferably used. More preferably, the light transmission layer 16 is formed of ultraviolet ray curable resin.

The light transmission layer 16 may be formed by adhering a sheet made of light transmittable resin to the surface of the first dielectric layer 15 using an adhesive agent.

Data are recorded in the optical recording medium 10 of the above-described configuration, in the following manner, for example.

As shown in FIG. 2, the first recording film 21 and the second recording film 22 are first irradiated via the light transmission layer 16 with a laser beam L having predetermined power.

In order to record data with high recording density, it is preferable to project a laser beam L having a wavelength λ of 450 nm or shorter onto the optical recording medium 10 via an objective lens (not shown) having a numerical aperture NA of 0.7 or more and it is more preferable that λ/NA be equal to or smaller than 640 nm.

In this embodiment, a laser beam L having a wavelength λ of 405 nm is projected onto the optical recording medium 10 via an objective lens having a numerical aperture NA of 0.85.

Figure 3:
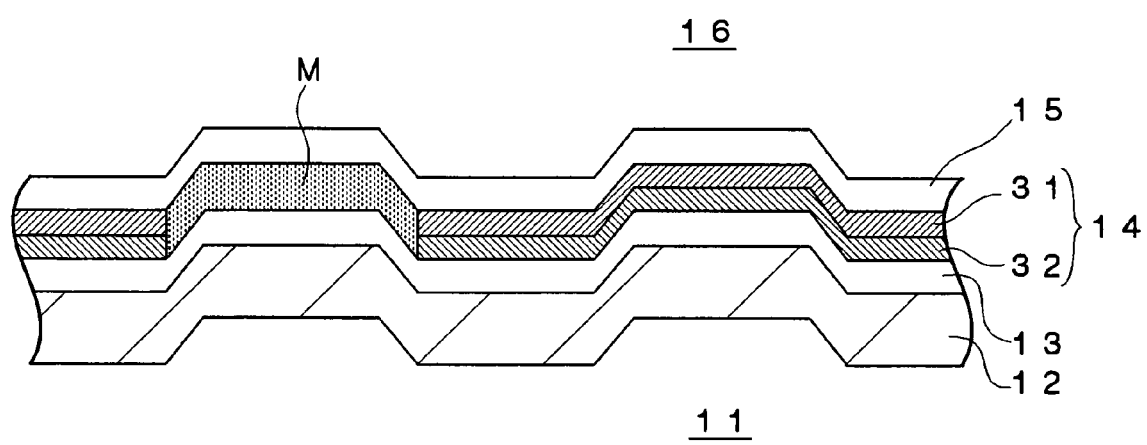
FIG. 3 is an enlarged schematic cross-sectional view showing the optical recording medium of FIG. 2 after recording data therein.

As a result, an element contained in the first recording film 21 as a primary component and an element contained in the second recording film 22 as a primary component are mixed at a region irradiated with the laser beam L and as shown in FIG. 3, a mixed region composed of a mixture of the primary component element of the first recording film 21 and the primary component element of the second recording film 22 is produced and a record mark M is formed.

When the primary component elements of the first recording films 21 and 22 are mixed, whereby a record mark M is formed, since the reflective coefficient with respect to a laser beam L of a region of the recording layer 14 where the record mark is formed in this manner and that of a region where no record mark is formed, namely, a blank region, are greatly different, data recorded in the recording layer 14 can be reproduced utilizing the difference in the reflection coefficients between the region of the recording layer 14 where the record mark is formed and the blank region.

The length of the record mark and the length of the blank region between the record mark and the neighboring record mark constitute data recorded in the recording layer 14. The record mark and the blank region are formed so as to have a length equal to an integral multiple of T, where T is a length corresponding to one cycle of a reference clock. In the case where 1,7 RLL modulation code is employed, record marks and blank regions having a length of 2T to 8T are formed.

Figure 4:
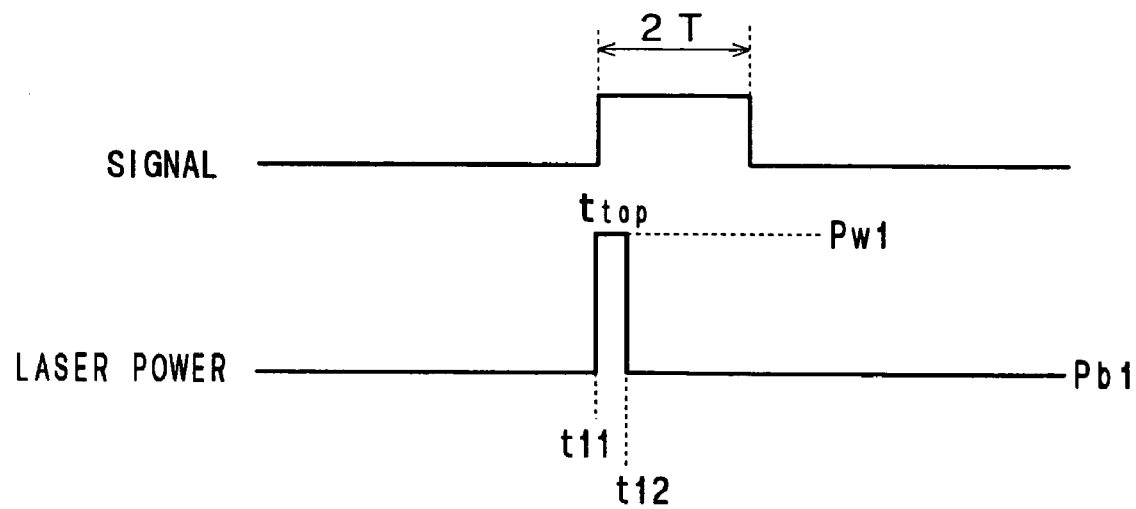
FIG. 4 is a diagram showing the waveform of a pulse train pattern for modulating the power of a laser beam in the case of recording 2T signals in a recording layer of an optical recording medium shown in FIGS. 1 and 2.
Figure 5:
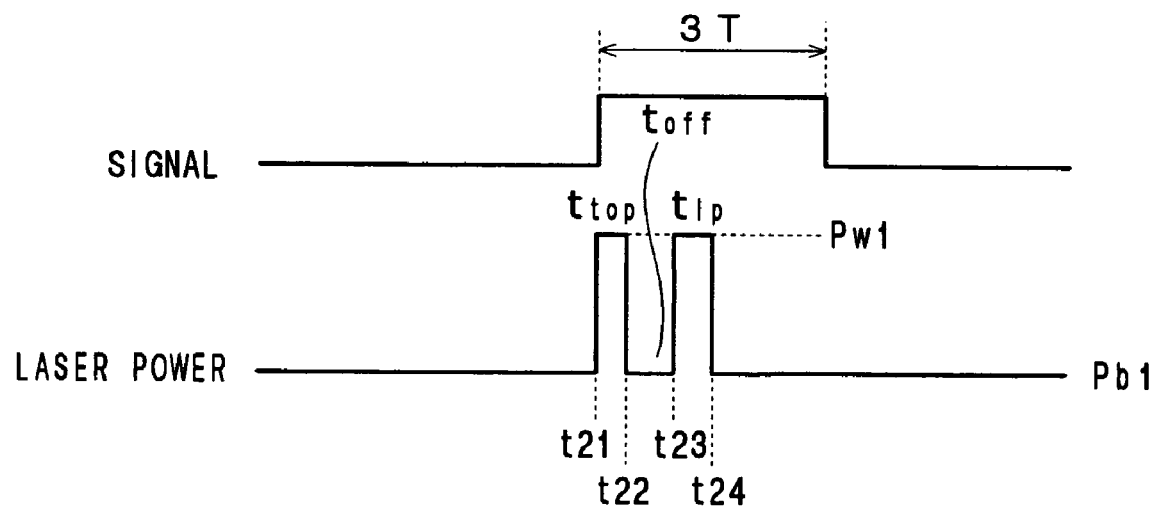
FIG. 5 is a diagram showing the waveform of a pulse train pattern for modulating the power of a laser beam in the case of recording 3T signals in a recording layer of an optical recording medium shown in FIGS. 1 and 2.
Figure 6:
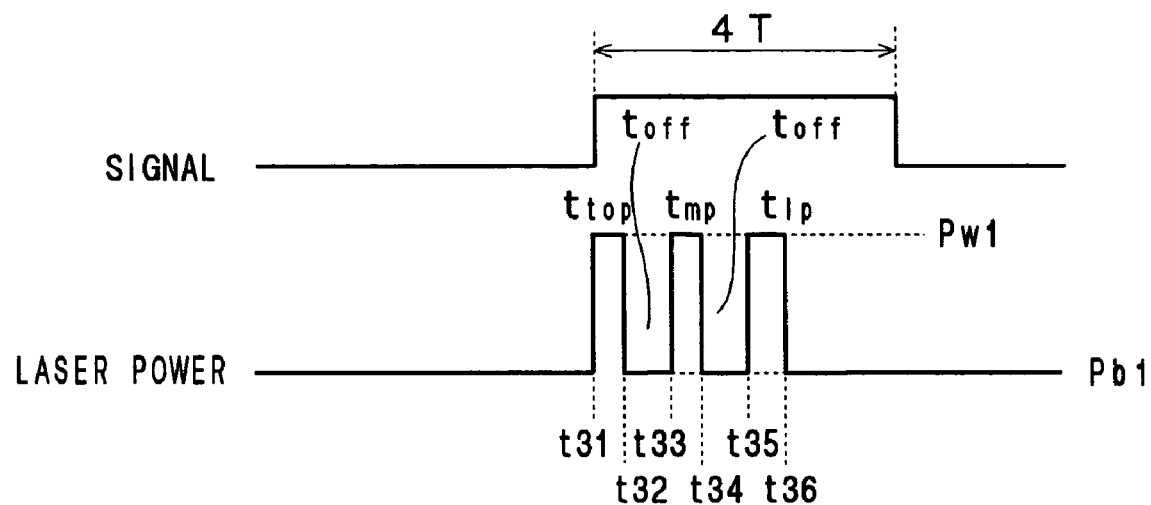
FIG. 6 is a diagram showing the waveform of a pulse train pattern for modulating the power of a laser beam in the case of recording 4T signals in a recording layer of an optical recording medium shown in FIGS. 1 and 2.
Figure 7:
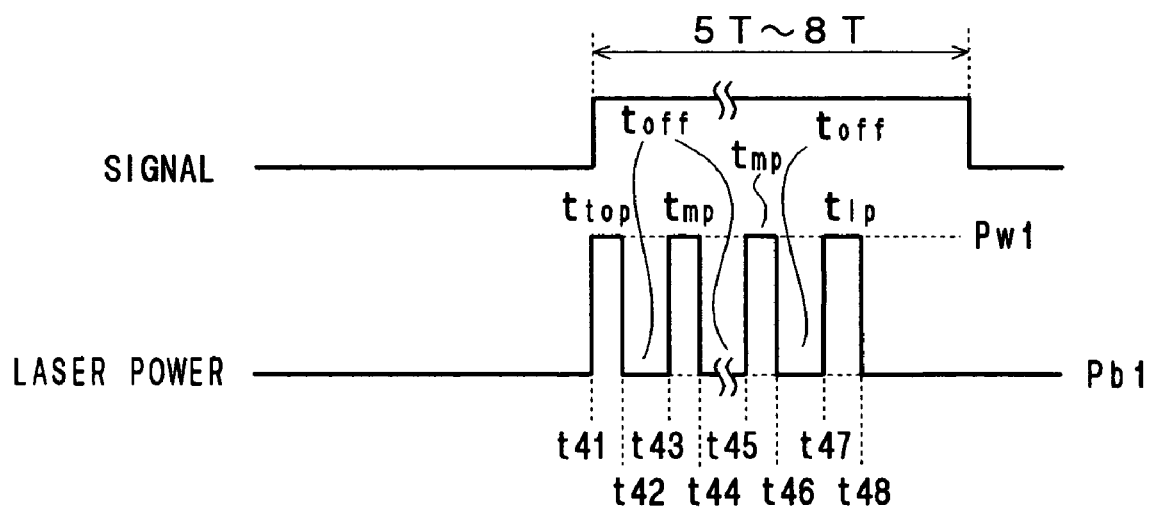
FIG. 7 is a diagram showing the waveform of a pulse pattern for modulating the power of a laser beam in the case of recording one among a 5T signal to an 8T signal in a recording layer of an optical recording medium shown in FIGS. 1 and 2.

Each of FIGS. 4 to 7 is a diagram showing the waveform of a pulse pattern for modulating the power of the laser beam L in the case of recording data in the recording layer 14 of the optical recording medium 10, where FIG. 4 shows a pulse pattern used in the case of recording 2T signals, FIG. 5 shows a pulse pattern used in the case of recording 3T signals, FIG. 6 shows a pulse pattern used in the case of recording 4T signals and FIG. 7 shows random signals used in the case of recording one among a 5T signal to an 8T signal.

As shown in FIGS. 4 to 7, the power of the laser beam L is modulated between two levels, a recording power Pw and a bottom power Pb where Pw>Pb.

The recording power Pw is set to such a high level that the element contained in the first recording film 21 as a primary component and Ti contained in the second recording film 22 as a primary component can be heated and mixed to form a record mark M when the laser beam L whose power is set to the recording power Pw is projected onto the recording layer 14. On the other hand, the bottom power Pb is set to such an extremely low level that regions of the recording layer 14 heated by irradiation with the laser beam L whose power is set to the recording power Pw can be cooled by irradiation with the laser beam L whose power is set to the bottom power Pb.

As shown in FIG. 4, in the case of recording a 2T signal in the recording layer 14 of the optical recording medium 10, the power of the laser beam L is modulated to be increased from the bottom power Pb to the recording power Pw at a time t11 and decreased from the recording power Pw to the bottom power Pb at a time t12 after passage of a predetermined time period $t_{top}$.

Therefore, in the case of recording a 2T signal in the L0 information recording layer 20 or the L1 information recording layer 30 of the optical recording medium 10, the number of a pulse having a level equal to the recording power Pw is set to be 1.

On the other hand, as shown in FIG. 5, in the case of recording a 3T signal in the recording layer 14 of the optical recording medium 10, the power of the laser beam L is modulated so that it is increased from the bottom power Pb to the recording power Pw at a time t21, decreased from the recording power Pw to the bottom power Pb at a time t22 after passage of a predetermined time period $t_{top}$, increased from the bottom power Pb to the recording power Pw at a time t23 after passage of a predetermined time period $t_{off}$ and decreased from the recording power Pw to the bottom power Pb at a time t24 after passage of a predetermined time period $t_{lp}$.

Therefore, in the case of recording a 3T signal in the recording layer 14 of the optical recording medium 10, the number of pulses each having a level equal to the recording power Pw is set to be 2.

Further, as shown in FIG. 6, in the case of recording a 4T signal in the recording layer 14 of the optical recording medium 10, the power of the laser beam L is modulated so that it is increased from the bottom power Pb to the recording power Pw at a time t31, decreased from the recording power Pw to the bottom power Pb at a time t32 after passage of a predetermined time period $t_{top}$, increased from the bottom power Pb to the recording power Pw at a time t33 after passage of a predetermined time period $t_{off}$, decreased from the recording power Pw to the bottom power Pb at a time t34 after passage of a predetermined time period $t_{mp}$, increased from the bottom power Pb to the recording power Pw at a time t35 after passage of a predetermined time period $t_{off}$ and decreased from the recording power Pw to the bottom power Pb at a time t36 after passage of a predetermined time period $t_{lp}$.

Therefore, in the case of recording a 4T signal in the recording layer 14 of the optical recording medium 10, the number of pulses each having a level equal to the recording power Pw is set to be 3.

Moreover, as shown in FIG. 7, in the case of recording one among a 5T signal to an 8T signal in the recording layer 14 of the optical recording medium 10, the power of the laser beam L is modulated so that it is increased from the bottom power Pb to the recording power Pw at a time t41, held at the recording power Pw during the time period $t_{top}$, the time periods $t_{mp}$ and the time period $t_{lp}$, held at the bottom power Pb during the time periods $t_{off}$ and decreased from the recording power Pw to the bottom power Pb at a time t48.

Therefore, in the case of recording one among a 5T signal to a 8T signal in the recording layer 14 of the optical recording medium 10, the number of pulses each having a level equal to the recording power Pw is set to be 4 to 7.

According to this embodiment, since the recording layer 14 of the optical recording medium 10 is formed of the first recording film 21 containing Si as a primary component and the second recording film 22 containing Ti as a primary component and Al as an additive in an amount equal to or more than 25 atomic % and less than 50 atomic % and a record mark is formed of a mixed region composed of Si contained in the first recording film 21 as a primary component and Ti contained in the second recording film 22 as a primary component in the recording layer 14, thereby recording data therein, it is possible to not only record data in the optical recording medium 10 with high sensitivity but also store data initially recorded with high sensitivity in the optical recording medium 10 for a long time.

Further, according to this embodiment, since the recording layer 14 of the optical recording medium 10 contains Si, Ti and Al and each of Si, Ti and Al is one of the most commonplace elements on earth, the load put on the global environment can be lightened.

Figure 8:
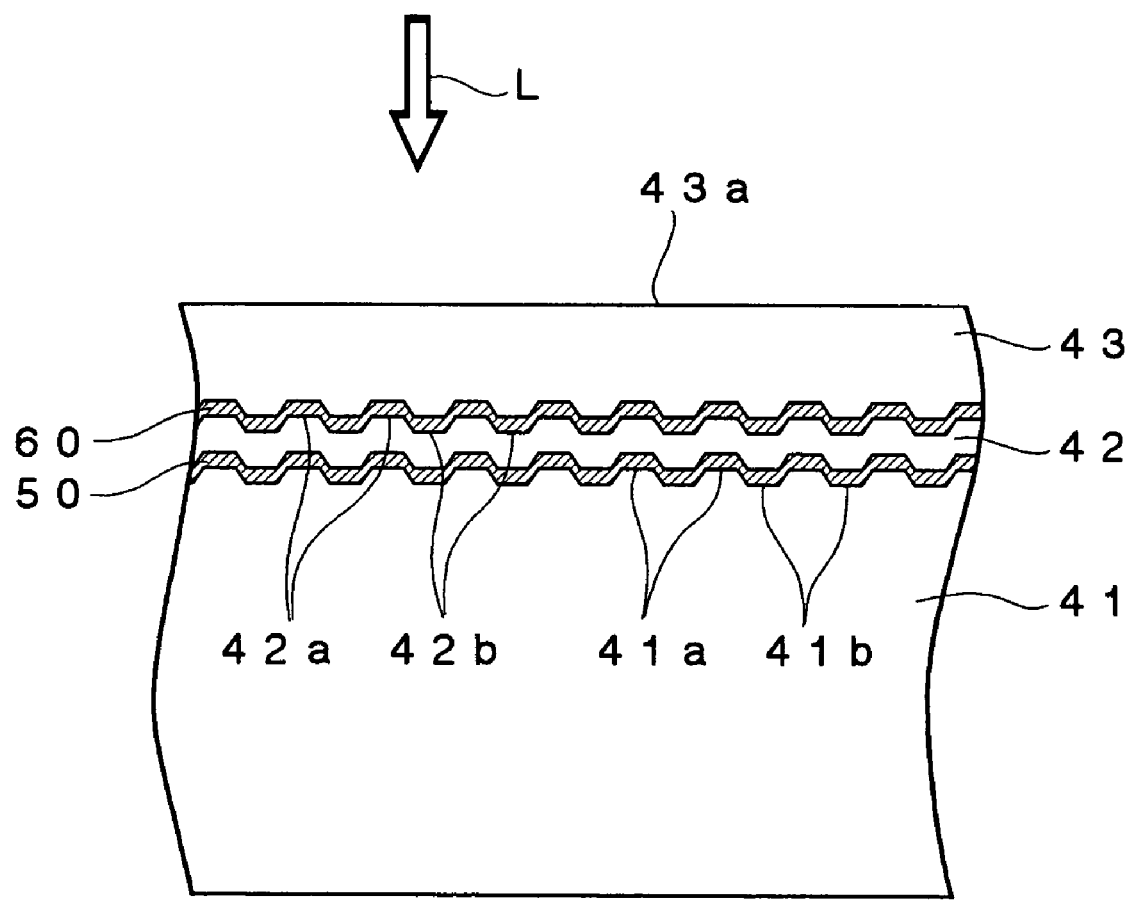
FIG. 8 is a partially enlarged schematic cross-sectional view showing an optical recording medium that is another preferred embodiment of the present invention.

FIG. 8 is a partially enlarged schematic cross-sectional view showing an optical recording medium that is another preferred embodiment of the present invention.

Similarly to the optical recording medium 10 shown in FIG. 1, an optical recording medium 40 according to this embodiment is formed disk-like and has an outer diameter of about 120 mm and a thickness of about 1.2 mm.

As shown in FIG. 8, the optical recording medium 40 according to this embodiment includes a support substrate 41, a transparent intermediate layer 42, a light transmission layer 43, an L0 information recording layer 50 formed between the support substrate 41 and the transparent intermediate layer 42, and an L1 information recording layer 60 formed between the transparent intermediate layer 42 and the light transmission layer 43, and a light incidence plane 43a through which a laser beam L enters is constituted by one surface of the light transmission layer 43.

The L0 information recording layer 50 constitutes an information recording layer far from the light incidence plane 43a and the L1 information recording layer 60 constitutes an information recording layer close to the light incidence plane 43a.

The support substrate 41 is formed similarly to the support substrate 11 of the optical recording medium 10, and as shown in FIG. 8, grooves 41a and lands 41b are formed on the surface thereof. The grooves 41a and/or lands 41b serve as a guide track for the laser beam L when data are to be recorded in or data are to be reproduced from the L0 information recording layer 50.

The transparent intermediate layer 42 serves to space the L0 information recording layer 50 and the L1 information recording layer 60 apart by a physically and optically sufficient distance.

As shown in FIG. 8, grooves 42a and lands 42b are formed on the surface of the transparent intermediate layer 42. The grooves 42a and/or lands 42b serve as a guide track for the laser beam L when data are to be recorded in or data are to be reproduced from the L1 information recording layer 60.

The material for forming the transparent intermediate layer 42 is not particularly limited and an ultraviolet ray curable acrylic resin is preferably used for forming the transparent intermediate layer 42.

It is necessary for the transparent intermediate layer 42 to have sufficiently high light transmittance since the laser beam L passes through the transparent intermediate layer 42 when data are to be recorded in the L0 information recording layer 50 and data recorded in the L0 information recording layer 50 are to be reproduced.

The light transmission layer 43 is formed similarly to the light transmission layer 16 of the optical recording medium 10.

Figure 9:
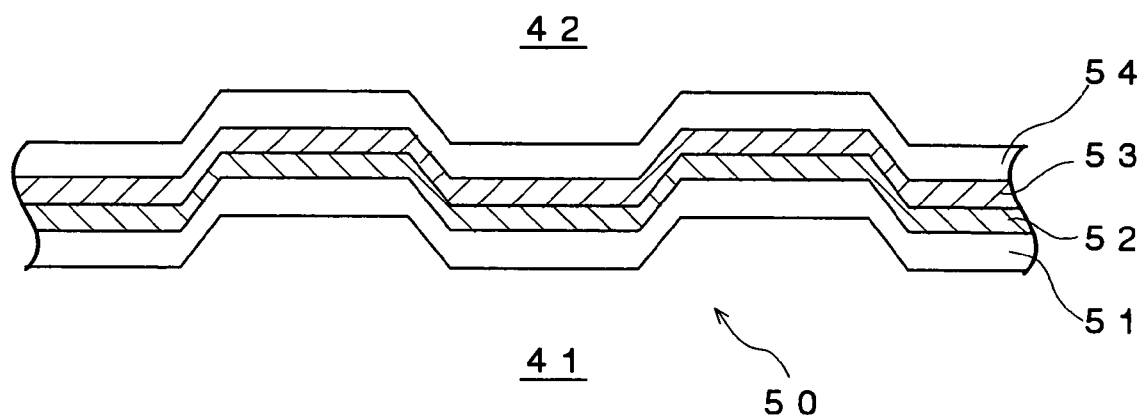
FIG. 9 is a schematic enlarged cross-sectional view showing details of an L0 information recording layer.

FIG. 9 is a schematic enlarged cross-sectional view showing details of the L0 information recording layer 50.

As shown in FIG. 9, the L0 information recording layer 50 is constituted by laminating a fourth dielectric film 51, a second L0 recording film 52, a first L0 recording film 53 and a third dielectric film 54 from the side of the support substrate 41.

In this embodiment, the first L0 recording film 53 contains an element selected from the group consisting of Si, Ge and Sn as a primary component and the second L0 recording film 52 contains Ti as a primary component and Al as an additive in an amount equal to or more than 25 atomic % and less than 50 atomic %.

Figure 10:
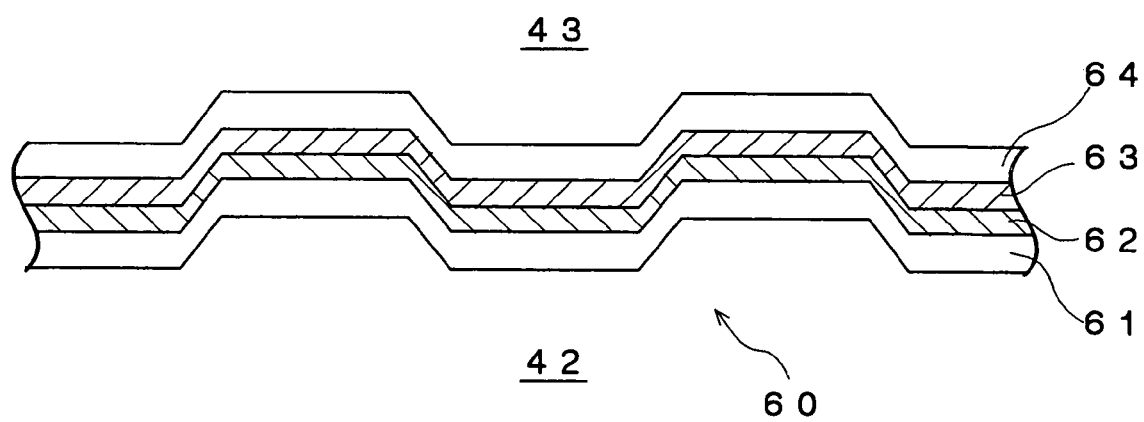
FIG. 10 is a schematic enlarged cross-sectional view showing details of an L1 information recording layer.

FIG. 10 is a schematic enlarged cross-sectional view showing details of the L1 information recording layer 60.

As shown in FIG. 10, the L1 information recording layer 60 is constituted by laminating a second dielectric film 61, a second L1 recording film 62, a first L1 recording film 63 and a first dielectric film 64.

In this embodiment, the first L1 recording film 63 contains an element selected from the group consisting of Si, Ge and Sn as a primary component and the second L1 recording film 62 contains Ti as a primary component and Al as an additive in an amount equal to or more than 25 atomic % and less than 50 atomic %.

In the case where data are to be recorded in the L0 information recording layer 50 and data recorded in the L0 information recording layer 50 are to be reproduced, a laser beam L is projected thereon through the L1 information recording layer 60 located closer to the light incidence plane 43a.

Therefore, it is necessary for the L1 information recording layer 60 to have a high light transmittance with respect to the laser beam L used for recording data and reproducing data. Concretely, the L1 information recording layer 60 preferably has a light transmittance equal to or higher than 40% with respect to the laser beam L and more preferably has a light transmittance equal to or higher than 50%.

Each of the first dielectric film 64, the second dielectric film 61, the third dielectric film 54 and the fourth dielectric film 51 is formed of a similar material to those of the first dielectric layer 15 and the second dielectric layer 13 and in a similar manner of forming the first dielectric layer 15 and the second dielectric layer 13.

Figure 11:
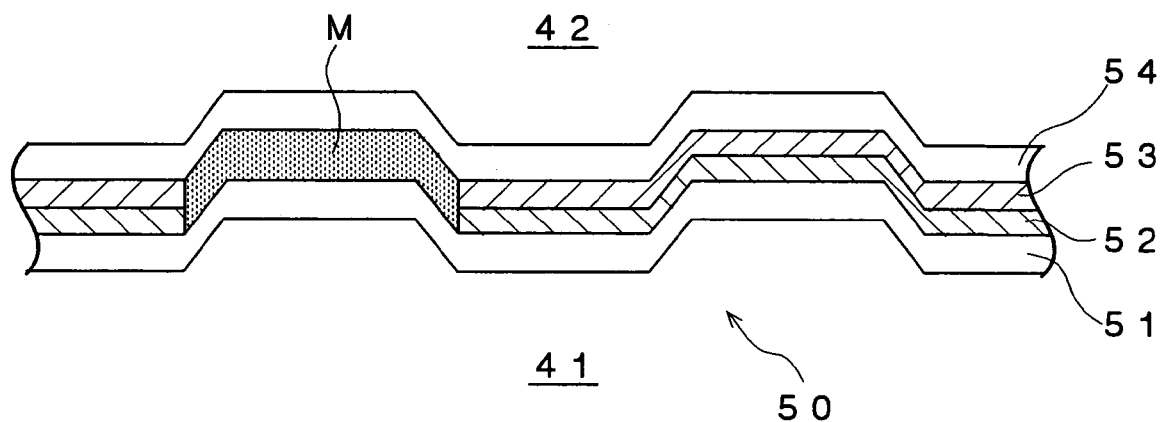
FIG. 11 is a schematic enlarged cross-sectional view showing an optical recording medium shown in FIG. 8 after an L0 information recording layer was irradiated with a laser beam.

FIG. 11 is a schematic enlarged cross-sectional view showing the optical recording medium 40 shown in FIG. 8 after the L0 information recording layer 50 was irradiated with a laser beam L.

As shown in FIG. 11, when the L0 information recording layer 50 of the optical recording medium 30 is irradiated with a laser beam L via a light incident plane 43a, the element contained in the first L0 recording film 53 as a primary component and Ti contained in the second L0 recording film 52 as a primary component are quickly fused or diffused and a region where the element contained in the first L0 recording film 53 as a primary component and Ti are mixed is formed, thereby forming a record mark M.

As shown in FIG. 11, when the element contained in the first L0 recording film 53 as a primary component and Ti contained in the second L0 recording film 53 as a primary component are mixed to form a record mark M, the reflection coefficient of a region where the record mark M has been formed greatly changes. Therefore, since the reflection coefficient of the region where the record mark M is formed is greatly different from that of the blank region of the L0 information recording layer 50 surrounding the region where the record mark M is formed, it is possible to obtain a high reproduced signal (C/N ratio) by reproducing data recorded in the L0 information recording layer 50.

Figure 12:
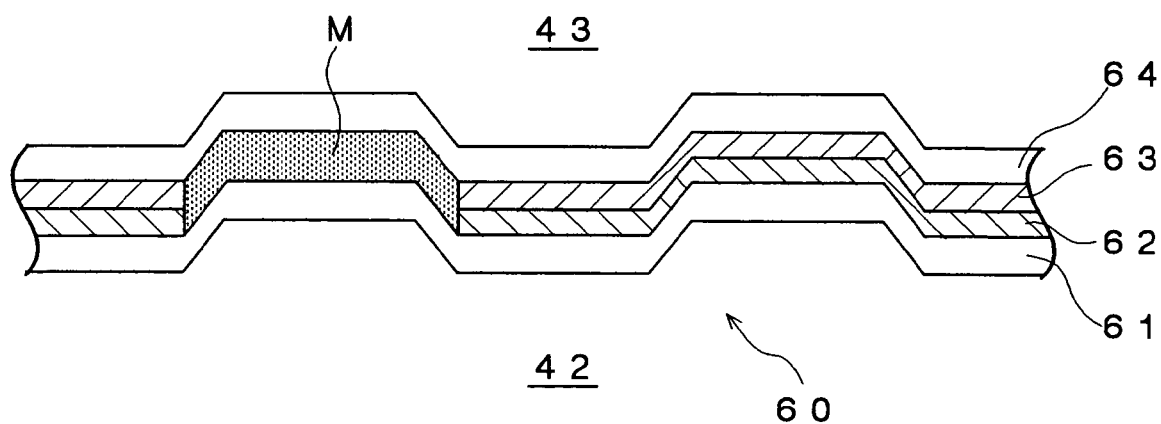
FIG. 12 is a schematic enlarged cross-sectional view showing an optical recording medium shown in FIG. 8 after an L1 information recording layer was irradiated with a laser beam.

FIG. 12 is a schematic enlarged cross-sectional view showing the optical recording medium 30 shown in FIG. 8 after the L1 information recording layer 60 was irradiated with a laser beam L.

As shown in FIG. 12, when the L1 information recording layer 60 of the optical recording medium 30 is irradiated with a laser beam L via a light incident plane 43a, the element contained in the first L1 recording film 63 as a primary component and Ti contained in the second L1 recording film 62 as a primary component are quickly fused or diffused and a region where the element contained in the first L1 recording film 63 as a primary component and Ti are mixed is formed, thereby forming a record mark M.

As shown in FIG. 12, when the element contained in the first L1 recording film 63 as a primary component and Ti contained in the second L1 recording film 63 as a primary component are mixed to form a record mark M, the reflection coefficient of a region where the record mark M has been formed greatly changes. Therefore, since the reflection coefficient of the region where the record mark M is formed is greatly different from that of the blank region of the L1 information recording layer 60 surrounding the region where the record mark M is formed, it is possible to obtain a high reproduced signal (C/N ratio) by reproducing data recorded in the L1 information recording layer 60.

Since the laser beam L passes through the L1 information recording layer 60 when data are recorded in the L0 information recording layer 50 and when data are reproduced from the L0 information recording layer 50, it is necessary for the L1 information recording layer 60 to have a high light transmittance. However, the L1 information recording layer 60 having the above configuration has a light transmittance equal to or higher than 50 and it is therefore possible to record data in the L0 information recording layer 50.

Further, since the laser beam L passes through the L1 information recording layer 60 when data are recorded in the L0 information recording layer 50 and when data are reproduced from the L0 information recording layer 50, if the difference in light transmittances between a region of the L1 information recording layer 60 where a record mark M is formed and a blank region of the L1 information recording layer 60 where no record mark M is formed is great, the amount of the laser beam L projected onto the L0 information recording layer 50 when data are recorded in the L0 information recording layer 50 greatly changes depending upon whether the region of the L1 information recording layer 60 through which the laser beam L passes is a region where a record mark M is formed or a blank region and when data are reproduced from the L0 information recording layer 50, the amount of the laser beam L reflected from the L0 information recording layer 50, transmitting through the L1 information recording layer 60 and detected greatly changes depending upon whether the region of the L1 information recording layer 60 through which the laser beam L passes is a region where a record mark M is formed or a blank region. As a result, the recording characteristics of the L0 information recording layer 50 and the amplitude of a signal reproduced from the L0 information recording layer 50 change greatly depending upon whether the region of the L1 information recording layer 60 through which the laser beam L passes is a region where a record mark M is formed or a blank region.

In particular, data recorded in the L0 information recording layer 50 cannot be reproduced in a desired manner if the region of the L1 information recording layer 60 through which the laser beam L passes contains a boundary between a region where a record mark M is formed and a blank region, because in such a case the distribution of the reflection coefficient is not uniform at the spot of the laser beam L.

In a study done by the inventors of the present invention, it was found that in order to record data in the L0 information recording layer 50 and reproduce data from the L0 information recording layer 50, it is preferable for the difference in light transmittances between a region of the L1 information recording layer 60 where a record mark M is formed and a blank region of the L1 information recording layer 60 to be equal to or lower than 2%.

The inventors of the present invention further found that the difference in light transmittances for a laser beam having a wavelength of 350 nm to 450 nm between the region of a record mark M formed by mixing the element selected from the group consisting of Si, Ge and Sn, and Ti and a blank region of the L1 information recording layer 60 formed by laminating the first L1 recording film 63 containing the element selected from the group consisting of Si, Ge and Sn as a primary component and the second L1 recording film 62 containing Ti as primary component is equal to or lower than 2% and the difference in light transmittances for a laser beam having a wavelength of about 405 nm between a region of the L1 information recording layer 60 where a record mark M is formed and a blank region of the L1 information recording layer 60 is equal to or lower than 1.6%.

Therefore, in this embodiment, when data are to be recorded in the L0 information recording layer 50, since the amount of the laser beam L projected onto the L0 information recording layer 50 hardly changes depending upon whether the region of the L1 information recording layer 60 through which the laser beam L passes is a region where a record mark M is formed or a blank region, the recording characteristics of the L0 information recording layer 50 can be markedly improved. Further, when data are reproduced from the L0 information recording layer 50, since the amount of the laser beam L reflected from the L0 information recording layer 50, transmitting through the L1 information recording layer 60 and detected hardly changes depending upon whether the region of the L1 information recording layer 60 through which the laser beam L passes is a region where a record mark M is formed or a blank region, it is possible to prevent the amplitude of a signal reproduced from the L0 information recording layer 50 from changing greatly depending upon whether the region of the L1 information recording layer 60 through which the laser beam L passes is a region where a record mark M is formed or a blank region.

Furthermore, according to this embodiment, when data recorded in the L0 information recording layer 50 are reproduced, even if the region of the L1 information recording layer 60 through which the laser beam L passes contains a boundary between a region where a record mark M is formed and a blank region, data recorded in the L0 information recording layer 50 can be reproduced in a desired manner.

Figure 13:
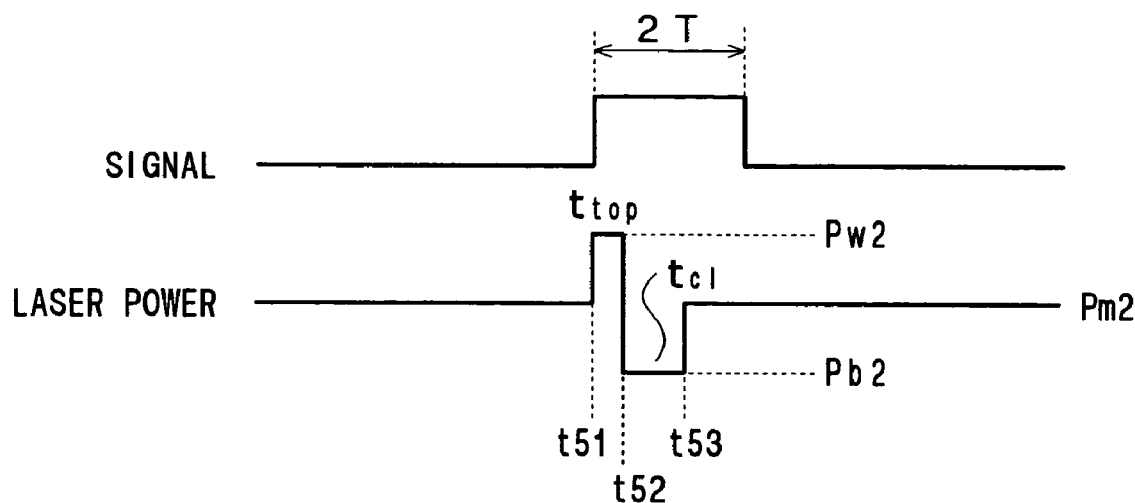
FIG. 13 is a diagram showing the waveform of a pulse train pattern for modulating the power of a laser beam in the case of recording 2T signals in an L1 information recording layer of an optical recording medium shown in FIG. 8.
Figure 14:
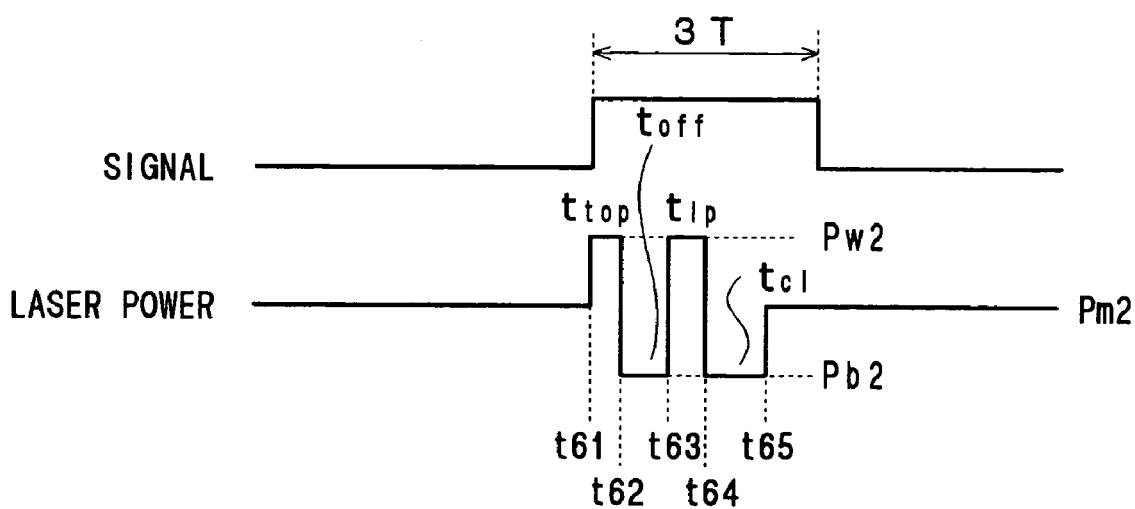
FIG. 14 is a diagram showing the waveform of a pulse train pattern for modulating the power of a laser beam in the case of recording 3T signals in an L1 information recording layer of an optical recording medium shown in FIG. 8.
Figure 15:
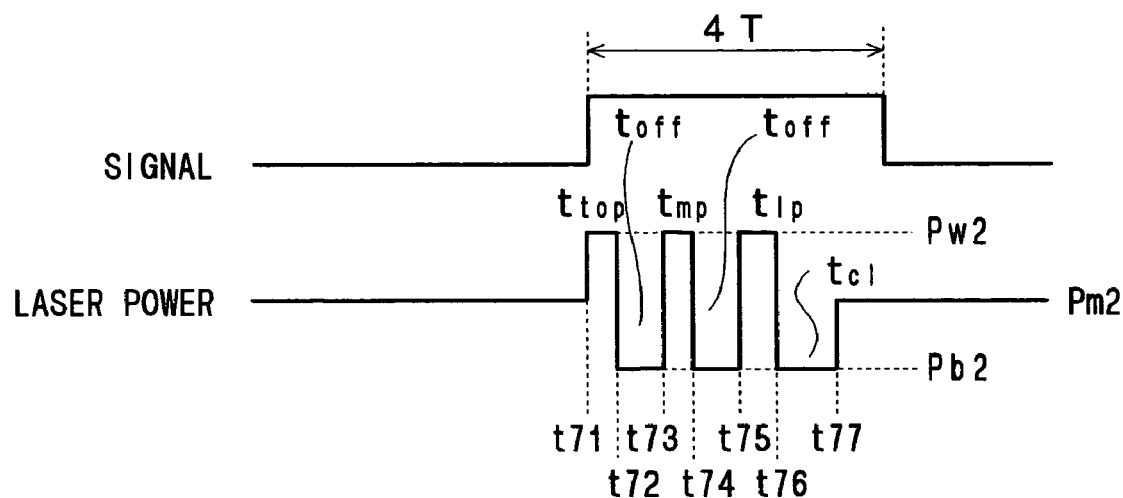
FIG. 15 is a diagram showing the waveform of a pulse train pattern for modulating the power of a laser beam in the case of recording 4T signals in an L1 information recording layer of an optical recording medium shown in FIG. 8.
Figure 16:
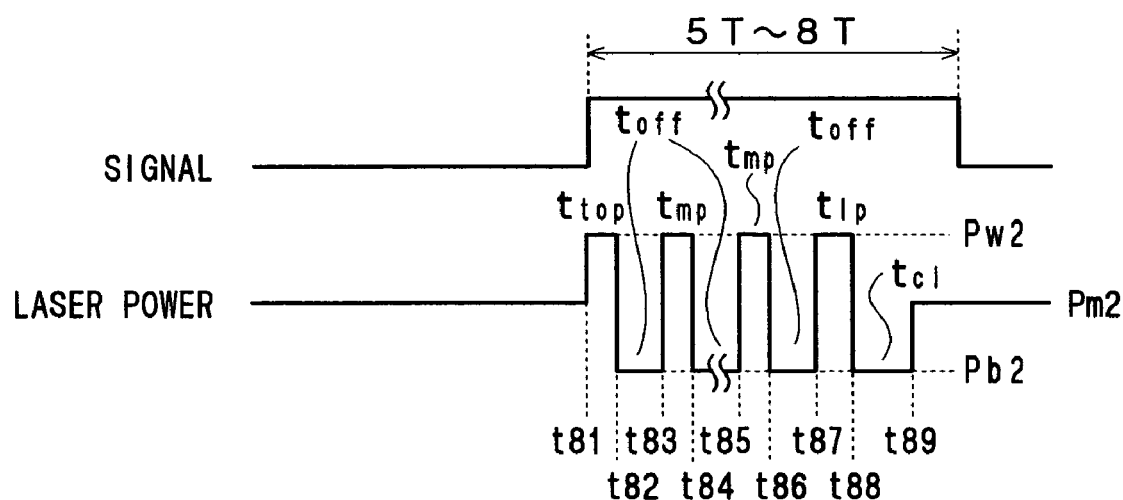
FIG. 16 is a diagram showing the waveform of a pulse pattern for modulating the power of a laser beam in the case of recording one among a 5T signal to an 8T signal in an L1 information recording layer of an optical recording medium shown in FIG. 8.

Each of FIGS. 13 to 16 is a diagram showing the waveform of a pulse train pattern for modulating the power of the laser beam L in the case of recording data in the L1 information recording layer 60 of the optical recording medium 40, where FIG. 13 shows a pulse train pattern used in the case of recording 2T signals, FIG. 14 shows a pulse train pattern used in the case of recording 3T signals, FIG. 15 shows a pulse train pattern used in the case of recording 4T signals and FIG. 16 shows a pulse train pattern used in the case of recording one among a 5T signal to an 8T signal.

As shown in FIGS. 13 to 16, the power of the laser beam L is modulated between three levels, a recording power Pw2, an intermediate power Pm2 and a bottom power Pb2 where Pw2>Pm2>Pb2.

The recording power Pw2 is set to such a high level that Si contained in the first L1 recording film 63 as a primary component and Cu contained in the second L1 recording film 62 as a primary component can be heated and mixed to form a record mark M when the laser beam L whose power is set to the recording power Pw2 is projected onto the L1 information recording layer 60 and. On the other hand, the intermediate power Pm2 and the bottom power Pb2 are set to such low levels that Si contained in the first L1 recording film 63 as a primary component and Cu contained in the second L1 recording film 62 as a primary component cannot be substantially mixed when the laser beam L whose power is set to the intermediate power Pm2 or the bottom power Pb2 is projected onto the L1 information recording layer 60. In particular, the bottom power Pb2 is set to such an extremely low level that regions of the L1 information recording layer 60 heated by irradiation with the laser beam L whose power is set to the recording power Pw2 can be cooled by irradiation with the laser beam L whose power is set to the bottom power Pb2.

As shown in FIG. 13, in the case of recording 2T signals in the L1 information recording layer 60 of the optical recording medium 40, the power of the laser beam L is modulated so that it is increased from the intermediate power Pm2 to the recording power Pw2, decreased from the recording power Pw2 to the bottom power Pb2 after passage of a predetermined time period $t_{top}$, and increased from the bottom power Ph2 to the intermediate power Pm2 after passage of a predetermined time period $t_{cl}$.

On the other hand, as shown in FIG. 14, in the case of recording 3T signals in the L1 information recording layer 60 of the optical recording medium 40, the power of the laser beam L is modulated so that it is increased from the intermediate power Pm2 to the recording power Pw2, decreased from the recording power Pw2 to the bottom power Pb2 after passage of a predetermined time period $t_{top}$, increased from the bottom power Pb2 to the recording power Pw2 after passage of a predetermined time period $t_{off}$, decreased from the recording power Pw2 to the bottom power Pb2 after passage of a predetermined time period $t_{lp}$, and increased from the bottom power Pb2 to the intermediate power Pm2 after passage of a predetermined time period $t_{cl}$.

Further, as shown in FIG. 15, in the case of recording 4T signals in the L1 information recording layer 60 of the optical recording medium 40, the power of the laser beam L is modulated so that it is increased from the intermediate power Pm2 to the recording power Pw2, decreased from the recording power Pw2 to the bottom power Pb2 after passage of a predetermined time period $t_{top}$, increased from the bottom power Pb2 to the recording power Pw2 after passage of a predetermined time period $t_{off}$, decreased from the recording power Pw2 to the bottom power Pb2 after passage of a predetermined time period $t_{mp}$, increased from the bottom power Pb2 to the recording power Pw2 after passage of a predetermined time period $t_{off}$, decreased from the recording power Pw2 to the bottom power Pb2 after passage of a predetermined time period $t_{lp}$, and increased from the bottom power Pb2 to the intermediate power Pm2 after passage of a predetermined time period $t_{cl}$.

Moreover, as shown in FIG. 16, in the case of recording one among a 5T signal to a 8T signal in the L1 information recording layer 60 of the optical recording medium 40, the power of the laser beam L is modulated so that it is increased from the intermediate power Pm2 to the recording power Pw2, held at the recording power Pw2 during the time period $t_{top}$, the time periods $t_{mp}$ and the time period $t_{lp}$, held at the bottom power Pb2 during the time periods $t_{off}$ and the time period $t_{cl}$ and increased from the bottom power Pb2 to the intermediate power Pm2 after passage of the time period $t_{cl}$.

In the case where data are recorded in the L1 information recording layer 60 of the optical recording medium 40 by modulating the power of a laser beam L using a pulse pattern shown in FIGS. 13 to 16, since the power of the laser beam L is modulated to the bottom power Pb2 immediately after being set to the recording power Pw2, even when data are recorded in the L1 information recording layer 60 provided with no reflective film, it is possible to prevent excessive heat from being accumulated in the L1 information recording layer 60 and it is therefore possible to prevent the degradation of characteristics of signals obtained by reproducing data recorded in the L1 information recording layer 60 caused by heat generated in the first L1 recording film 63 and the second L1 recording film 62 even though the L1 information recording layer 60 includes no reflective film.

According to this embodiment, since the L0 information recording layer 50 of the optical recording medium 40 is formed of a first L0 recording film 53 containing Si as a primary component and the second L0 recording film 52 containing Ti as a primary component and Al as an additive in an amount equal to or more than 25 atomic % and less than 50 atomic % and a record mark is formed of a mixed region composed of Si contained in the first L0 recording film 53 as a primary component and Ti contained in the second L0 recording film 52 as a primary component in the L0 information recording layer 50, thereby recording data therein, it is possible to not only record data in the L0 information recording layer 50 of the optical recording medium 40 with high sensitivity but also store data initially recorded with high sensitivity in the L0 information recording layer 50 of the optical recording medium 40 for a long time.

Further, according to this embodiment, since the L1 information recording layer 60 of the optical recording medium 40 is formed of a first L1 recording film 63 containing Si as a primary component and the second L1 recording film 62 containing Ti as a primary component and Al as an additive in an amount equal to or more than 25 atomic % and less than 50 atomic % and a record mark is formed of a mixed region composed of Si contained in the first L1 recording film 63 as a primary component and Ti contained in the second L1 recording film 62 as a primary component in the L1 information recording layer 60, thereby recording data therein, it is possible to not only record data in the L1 information recording layer 60 of the optical recording medium 40 with high sensitivity but also store data initially recorded with high sensitivity in the L1 information recording layer 60 of the optical recording medium 40 for a long time.

Furthermore, according to this embodiment, since each of the L0 information recording layer 50 and the L1 information recording layer 60 of the optical recording medium 40 contains Si, Ti and Al and each of Si, Ti and Al is one of the most commonplace elements on earth, the load put on the global environment can be lightened.

WORKING EXAMPLES AND COMPARATIVE EXAMPLES

Hereinafter, working examples will be set out in order to further clarify the advantages of the present invention.

Working Example 1

An optical recording medium sample #1 was fabricated in the following manner.

A disk-like polycarbonate substrate having a thickness of 1.1 mm and a diameter of 120 mm and formed with grooves and lands on the surface thereof was first fabricated by an injection molding process.

Then, the polycarbonate substrate was set on a sputtering apparatus and a reflective layer consisting of an alloy of Ag, Pd and Cu and having a thickness of 100 nm, a second dielectric layer containing a mixture of ZnS and $SiO_2$ and having a thickness of 26 nm, a second recording film containing Ti as a primary component and 43 atomic % of Al as an additive and having a thickness of 5 nm, a first recording film containing Si as a primary component and having a thickness of 5 nm and a first dielectric film containing $TiO_2$ and having a thickness of 30 nm were sequentially formed on the surface of the polycarbonate substrate on which the grooves and lands were formed, using the sputtering process.

The mole ratio of ZnS to $SiO_2$ in the mixture of ZnS and $SiO_2$ contained in each of the first dielectric layer and the second dielectric layer was 80:20.

Further, the polycarbonate substrate formed with the reflective layer, the second dielectric layer, the second recording film, the first recording film and the first dielectric layer on the surface thereof was set on a spin coating apparatus and the first dielectric layer was coated using the spin coating method with a resin solution prepared by dissolving acrylic ultraviolet ray curable resin in a solvent to form a coating layer and the coating layer was irradiated with ultraviolet rays, thereby curing the acrylic ultraviolet ray curable resin to form a light transmission layer having a thickness of 100 μm.

Thus, the optical recording medium sample #1 was fabricated.

Further, an optical recording medium comparative sample #1 was fabricated in the same manner as that of fabricating the optical recording medium sample #1 except that a second recording film containing Ti as a primary component and 23 atomic % of Al and 13 atomic % of Au as an additive was formed.

Each of the optical recording medium sample #1 and the optical recording medium comparative sample #1 was set in an optical recording medium evaluation apparatus "DDU1000 "(Product Name) manufactured by Pulstec Industrial Co., Ltd. and a laser beam having a wavelength of 405 nm whose power was modulated in accordance with the pulse patterns shown in FIGS. 3 to 6 was focused onto the first recording film and the second recording film using an objective lens whose numerical aperture was 0.85 via the light transmission layer while each of the samples was rotated at a linear velocity of 4.9 m/sec, thereby recording random signals including a 2T signal to an 8T signal therein in the 1,7 RLL Modulation Code.

The pulse widths of the pulse train pattern were set so that $t_{top}$ was equal to 0.7T, $t_{mp}$ was equal to 0.5T and $t_{lp}$ was equal to 0.5T.

The random signals were recorded in the optical recording medium sample #1 by setting the recording power Pw1 of the laser beam to 4.4 mW and in the optical recording medium comparative sample #1 by setting the recording power Pw1 of the laser beam to 4.8 mW, while the bottom power of the laser beam was fixed at 1.0 mW.

Then, each of the optical recording medium sample #1 and the optical recording medium comparative sample #1 was set in the above mentioned optical recording medium evaluation apparatus and a laser beam having a wavelength of 405 nm was focused onto the first recording film and the second recording film using an objective lens whose numerical aperture was 0.85 via the light transmission layer while the optical recording medium sample #1 was rotated at a linear velocity of 4.9 m/sec, thereby reproducing a signal recorded in the optical recording medium sample #1 and clock jitter of the reproduced was measured, thereby measuring the lowest clock jitter. Further, a reflective coefficient of a blank region between neighboring record marks of each sample was measured.

The fluctuation a of a reproduced signal was measured using a time interval analyzer and the clock jitter was calculated as σ/Tw, where Tw was one clock period.

Then, each of the optical recording medium sample #1 and the optical recording medium comparative sample #1 was held at a temperature of 80° C. and relative humidity of 85% and similarly to the above, the random signals recorded prior to storage of each sample at a temperature of 80° C. and relative humidity of 85% were reproduced and jitter of the reproduced signal and the reflection coefficient of a blank region between neighboring record marks of each sample were measured at the points of time when 100 hours had passed, when 200 hours had passed and when 300 hours had passed. Further, similarly to the above, random signals were recorded in each sample and the thus recorded random signals were reproduced and jitter of the reproduced signal and the reflection coefficient of a blank region between neighboring record marks of each sample were measured.

Figure 17:
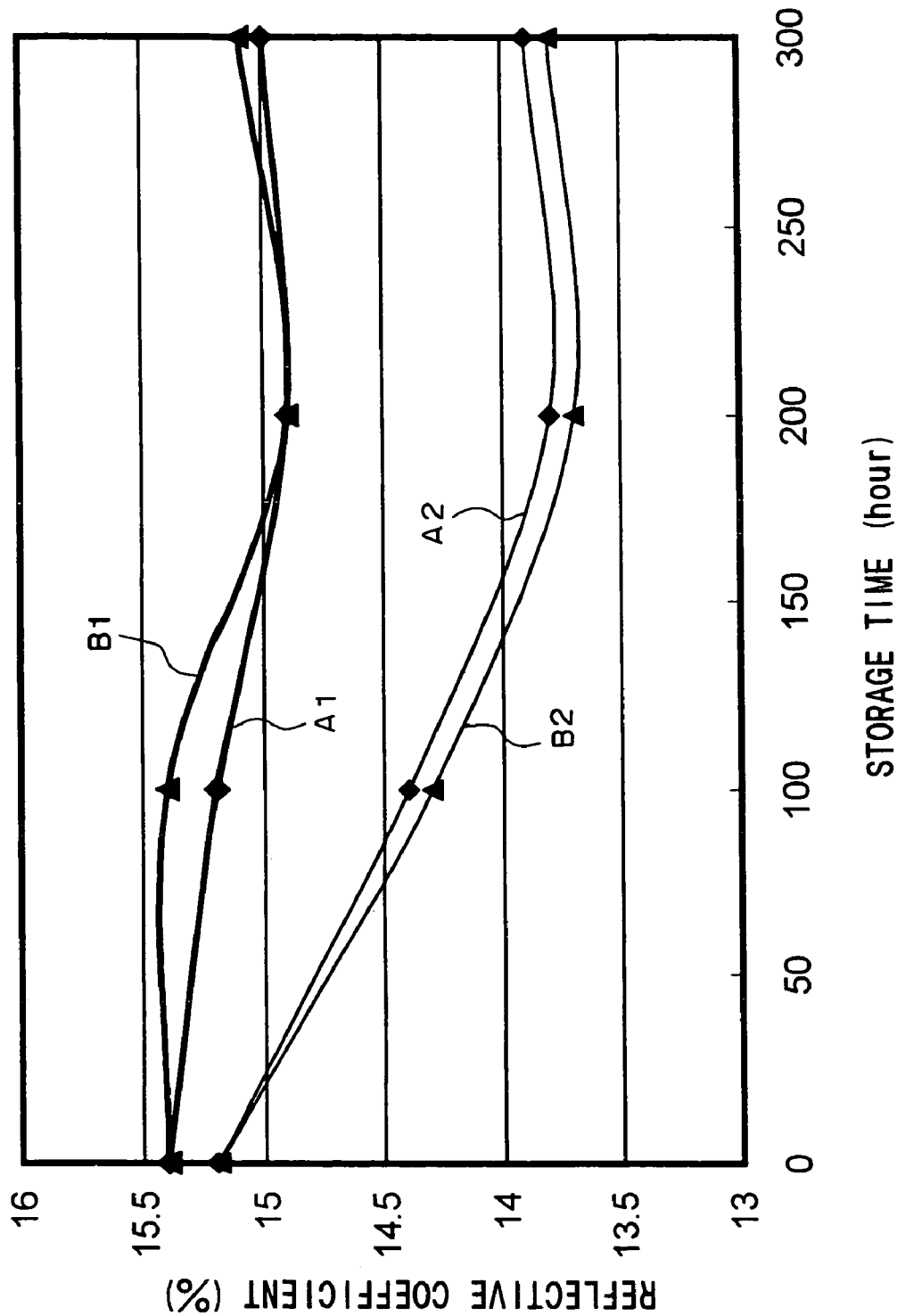
FIG. 17 is a graph showing how a reflection coefficient of each of an optical recording medium sample #1 and an optical recording medium comparative sample #1 varied with storage time.
Figure 18:
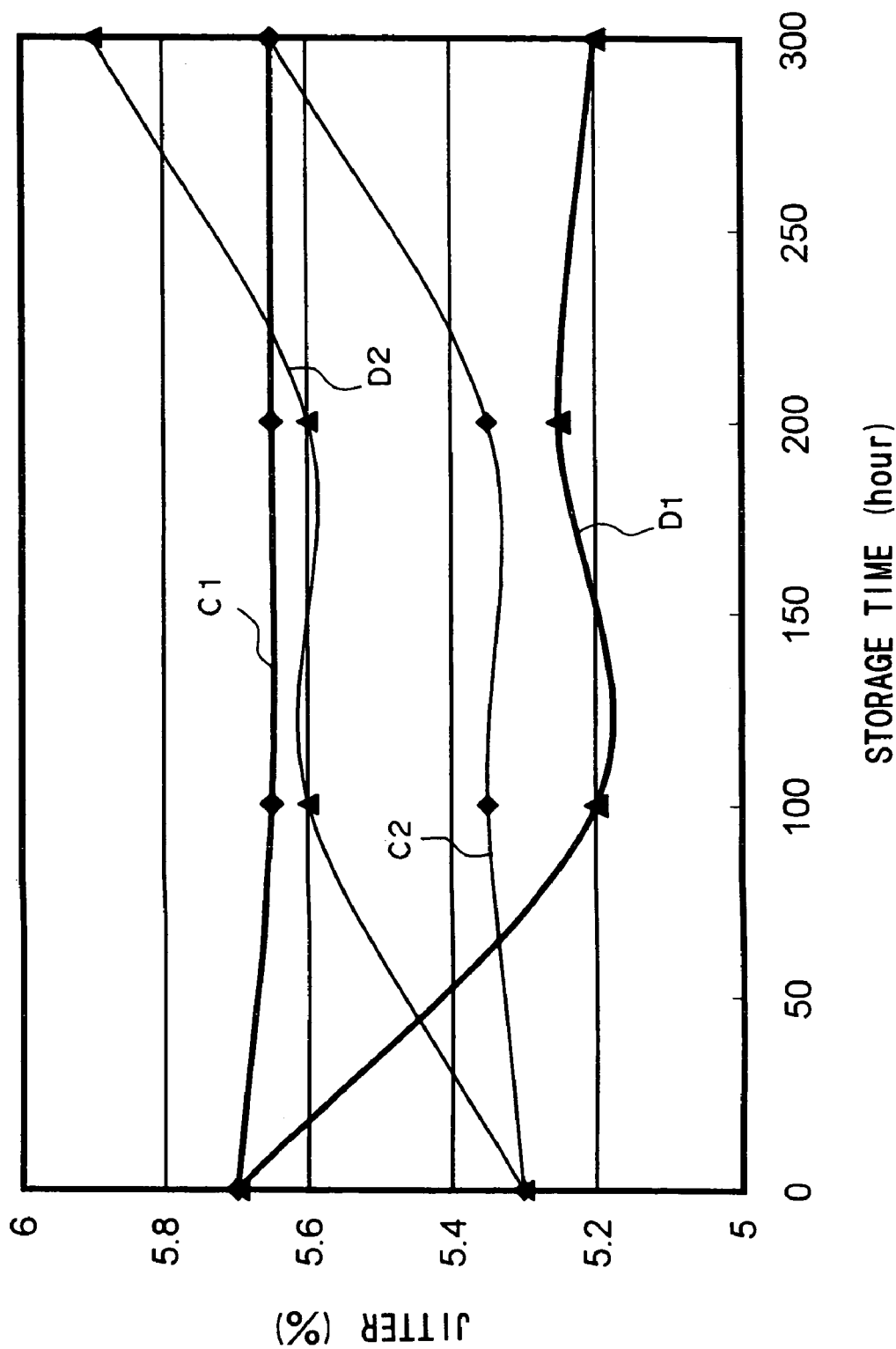
FIG. 18 is a graph showing how the lowest jitter of a signal reproduced from an optical recording medium sample #1 and an optical recording medium comparative sample #1 varied with storage time thereof.

How the reflection coefficient of each sample varied with the storage time is shown in FIG. 17 and how jitter of the reproduced signal of each sample varied with the storage time is shown in FIG. 18.

In FIG. 17, the curve A1 and curve A2 each shows the relationship between the reflective coefficient of the blank region of each of the optical recording medium sample #1 and the optical recording medium comparative sample #1 and the storage time measured when the random signals recorded in each sample prior to storage of each sample at a temperature of 80° C. and relative humidity of 85% were reproduced and the curve B1 and curve B2 each shows the relationship between the reflective coefficient of the blank region of each of the optical recording medium sample #1 and the optical recording medium comparative sample #1 and the storage time measured when the random signals were recorded in each sample after each sample was held at a temperature of 80° C. and relative humidity of 85% and the thus recorded random signals were reproduced.

Further, in FIG. 18, the curve C1 and curve C2 each shows the relationship between jitter of a reproduced signal from each of the optical recording medium sample #1 and the optical recording medium comparative sample #1 and the storage time measured when the random signals recorded in each sample prior to storage of each sample at a temperature of 80° C. and relative humidity of 85% were reproduced and the curve D1 and curve D2 each shows the relationship between jitter of a reproduced signal from each of the optical recording medium sample #1 and the optical recording medium comparative sample #1 and the storage time measured when the random signals were recorded in each sample after each sample was held at a temperature of 80° C. and relative humidity of 85% and the thus recorded random signals were reproduced.

As shown in FIG. 17, it was found that in the optical recording medium comparative sample #1, the reflection coefficient of the blank region gradually decreased with storage time in both the case where the random signals recorded therein prior to storage of each sample at a temperature of 80° C. and relative humidity of 85% were reproduced and the case where the random signals were recorded therein after it was held at a temperature of 80° C. and relative humidity of 85% and the thus recorded random signals were reproduced, but that in the optical recording medium sample #1, the reflection coefficient of the blank region hardly decreased with storage time in both the case where the random signals recorded therein prior to storage of each sample at a temperature of 80° C. and relative humidity of 85% were reproduced and the case where the random signals were recorded therein after it was held sample at a temperature of 80° C. and relative humidity of 85% and the thus recorded random signals were reproduced.

Further, as shown in FIG. 18, it was found that in the optical recording medium of comparative sample #1, jitter of a reproduced signal increased with the storage time in both the case where the random signals recorded therein prior to storage of each sample at a temperature of 80° C. and relative humidity of 85% were reproduced and the case where the random signals were recorded therein after it was held at a temperature of 80° C. and relative humidity of 85% and the thus recorded random signals were reproduced, but that in the optical recording medium sample #1, increase in jitter of the reproduced signal with storage time was not observed in either the case where the random signals recorded therein prior to storage of each sample at a temperature of 80° C. and relative humidity of 85% were reproduced or the case where the random signals were recorded therein after it was held sample at a temperature of 80° C. and relative humidity of 85% and the thus recorded random signals were reproduced.

Working Example 2

An optical recording medium sample #1-1 was fabricated in the following manner.

A disk-like polycarbonate substrate having a thickness of 1.1 mm and a diameter of 120 mm and formed with grooves and lands on the surface thereof was first fabricated by an injection molding process.

Then, the polycarbonate substrate was set on a sputtering apparatus and a second dielectric layer containing a mixture of ZnS and $SiO_2$ and having a thickness of 25 nm, a second recording film containing Ti as a primary component and having a thickness of 5 nm, a first recording film containing Si as a primary component and having a thickness of 4 nm and a first dielectric film containing $TiO_2$ and having a thickness of 33 nm were sequentially formed on the surface of the polycarbonate substrate on which the grooves and lands were formed, using the sputtering process.

The mole ratio of ZnS to $SiO_2$ in the mixture of ZnS and $SiO_2$ contained in the second dielectric layer was 80:20.

Further, the polycarbonate substrate formed with the second dielectric layer, the second recording film, the first recording film and the first dielectric layer on the surface thereof was set on a spin coating apparatus and the first dielectric layer was coated using the spin coating method with a resin solution prepared by dissolving acrylic ultraviolet ray curable resin in a solvent to form a coating layer and the coating layer was irradiated with ultraviolet rays, thereby curing the acrylic ultraviolet ray curable resin to form a light transmission layer having a thickness of 100 μm.

Thus, the optical recording medium sample #2-1 was fabricated.

Further, an optical recording medium sample #2-2 was fabricated in the same manner as that of fabricating the optical recording medium sample #2-1 except that a second recording film containing Ti as a primary component and 15.0 atomic % of Al as an additive was formed.

Furthermore, an optical recording medium sample #2-3 was fabricated in the same manner as that of fabricating the optical recording medium sample #2-1 except that a second recording film containing Ti as a primary component and 26.4 atomic % of Al as an additive was formed.

Moreover, an optical recording medium sample #2-4 was fabricated in the same manner as that of fabricating the optical recording medium sample #2-1 except that a second recording film containing Ti as a primary component and 34.3 atomic % of Al as an additive was formed.

Further, an optical recording medium sample #2-5 was fabricated in the same manner as that of fabricating the optical recording medium sample #2-1 except that a second recording film containing Ti as a primary component and 42.7 atomic % of Al as an additive was formed and a first dielectric layer having a thickness of 30 nm was formed.

Furthermore, an optical recording medium comparative sample #2-1 was fabricated in the same manner as that of fabricating the optical recording medium sample #2-1 except that a second recording film containing 47.7 atomic % of Ti and 52.3 atomic % of Al was formed and a first dielectric layer having a thickness of 30 nm was formed.

Moreover, an optical recording medium comparative sample #2-2 was fabricated in the same manner as that of fabricating the optical recording medium sample #2-1 except that a second recording film containing 41.2 atomic % of Ti and 58.8 atomic % of Al was formed and a first dielectric layer having a thickness of 30 nm was formed.

Further, an optical recording medium comparative sample #2-3 was fabricated in the same manner as that of fabricating the optical recording medium sample #2-1 except that a second recording film containing 31.9 atomic % of Ti and 68.1 atomic % of Al was formed and a first dielectric layer having a thickness of 30 nm was formed.

Furthermore, an optical recording medium comparative sample #2-4 was fabricated in the same manner as that of fabricating the optical recording medium sample #2-1 except that a second recording film containing 26.4 atomic % of Ti and 73.6 atomic % of Al was formed and a first dielectric layer having a thickness of 30 nm was formed.

Moreover, an optical recording medium comparative sample #2-5 was fabricated in the same manner as that of fabricating the optical recording medium sample #2-1 except that a second recording film containing 17.8 atomic % of Ti and 82.2 atomic % of Al was formed and a first dielectric layer having a thickness of 30 nm was formed.

Further, an optical recording medium comparative sample #2-6 was fabricated in the same manner as that of fabricating the optical recording medium sample #2-1 except that a second recording film containing 9.4 atomic % of Ti and 90.6 atomic % of Al was formed and a first dielectric layer having a thickness of 30 nm was formed.

Furthermore, an optical recording medium comparative sample #2-7 was fabricated in the same manner as that of fabricating the optical recording medium sample #2-1 except that a second recording film containing 1.1 atomic % of Ti and 98.9 atomic % of Al was formed and a first dielectric layer having a thickness of 30 nm was formed.

The optical recording medium sample #2-1 was set in the above mentioned optical recording medium evaluation apparatus and a laser beam having a wavelength of 405 nm and whose power was modulated using a pulse train pattern shown in FIGS. 13 to 16 was focused onto the first recording film and the second recording film using an objective lens whose numerical aperture was 0.85 via the light transmission layer while the optical recording medium sample #2-1 was rotated at a linear velocity of 5.3 m/sec, thereby recording random signals including 2T signals to 8T signals in the 1,7 RLL Modulation Code therein.

The pulse widths of the pulse train pattern were set so that $t_{top}$ was equal to 0.5T, $t_{mp}$ and $t_{lp}$ were equal to 0.4T and $t_{cl}$ was equal to 1.2T.

The random signals were recorded in the optical recording medium sample #2-1 by setting the recording power Pw2 of the laser beam to 7.0 mW, while the intermediate power Pm2 was set between 1.6 mW and 2.4 mW and the bottom power of the laser beam was fixed at 0.1 mW.

Then, the optical recording medium sample #2-1 was set in the above mentioned optical recording medium evaluation apparatus and a laser beam having a wavelength of 405 nm was focused onto the first recording film and the second recording film using an objective lens whose numerical aperture was 0.85 via the light transmission layer while the optical recording medium sample #2-1 was rotated at a linear velocity of 5.3 m/sec, thereby reproducing a signal recorded in the optical recording medium sample #2-1 and clock jitter of the reproduced was measured, thereby measuring the lowest clock jitter.

Then, similarly to the above, random signals were recorded in the optical recording medium sample #2-1 while increasing the recording power Pw2 of the laser beam in increments of 0.2 mW up to 10.0 mW and signals reproduced from the optical recording medium sample #2-1 similarly to the above were measured.

The lowest clock jitter was determined from among the thus measured clock jitters and the recording power Pw2 at which the clock jitter of the reproduced signal was lowest was determined as an optimum recording power of the laser beam.

Further, when the random signals were recorded in the optical recording medium sample #2-1 using a laser beam whose recording power Pw2 was set to the optimum recording power, the reflection coefficient Rb of a record mark and the reflection coefficient Rt of a blank region between neighboring record marks were measured, thereby calculating the modulation of the optical recording medium sample #2-1.

The modulation was defined as (Rt−Rb)/100Rt.

Furthermore, each of the optical recording medium samples #2-2 to #2-5 and the optical recording medium comparative samples #2-1 to #2-7 was sequentially set in the above mentioned optical recording medium evaluation apparatus and random signals were recorded in each sample in the manner of recording the random signals in the optical recording medium sample #2-1.

The random signals were recorded in each of the optical recording medium samples #2-2 to #2-5 and the optical recording medium comparative samples #2-1 to #2-7 with the recording power Pw2 of the laser beam set at 7.0 mW, while the intermediate power Pm2 was set to between 1.6 mW and 2.4 mW and the bottom power of the laser beam was fixed at 0.1 mW.

Then, each of the optical recording medium samples #2-2 to #2-5 and the optical recording medium comparative samples #2-1 to #2-7 was set in the above mentioned optical recording medium evaluation apparatus and a signal recorded in each sample was reproduced in the manner of reproducing the signal from the optical recording medium sample #2-1 and clock jitter of the reproduced signal was measured.

Further, similarly to in the optical recording medium sample #2-1, random signals were recorded in each of the optical recording medium samples #2-2 to #2-5 and the optical recording medium comparative samples #2-1 to #2-7 by increasing the recording power Pw2 of the laser beam in increments of 0.2 mW up to 10.0 mW and clock jitter of a signal reproduced from each sample was measured.

Then, the lowest clock jitter of each of the optical recording medium samples #2-2 to #2-5 and the optical recording medium comparative samples #2-1 to #2-7 was determined from among the thus measured clock jitters of the signal reproduced from each sample and the recording power Pw2 at which the clock jitter of a reproduced signal was lowest was determined as an optimum recording power of the laser beam of each sample.

Further, when the random signals were recorded using a laser beam whose recording power Pw2 was set to the optimum recording power in each of the optical recording medium samples #2-2 to #2-5 and the optical recording medium comparative samples #2-1 to #2-7, a reflection coefficient Rb of the record mark and the reflection coefficient Rt of a blank region between neighboring record marks were measured, thereby calculating the modulation of each of the optical recording medium samples #2-2 to #2-5 and the optical recording medium comparative samples #2-1 to #2-7.

Figure 19:
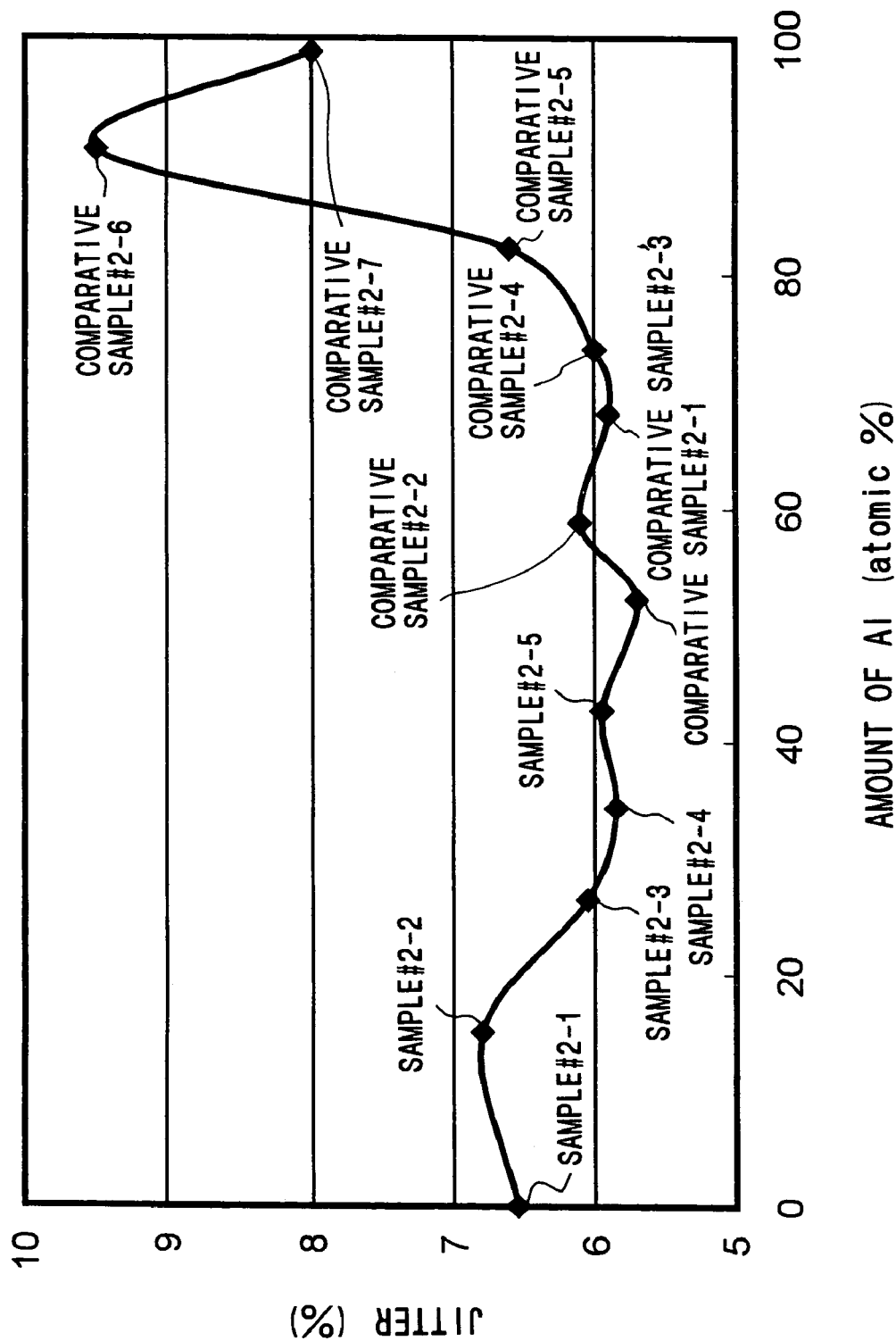
FIG. 19 is a graph showing how the lowest jitter of a signal reproduced from each of optical recording medium samples #2-1 to #2-5 and optical recording medium comparative samples #2-1 to #2-7 varied with an amount of Al contained in a second recording film thereof.

The relationship between the thus determined lowest jitter and the amount of Al contained in the second recording film is shown in FIG. 19 and the relationship between the thus calculated modulation and the amount of Al contained in the second recording film is shown in FIG. 20.

As shown in FIG. 19, it was found that although jitter exceeded 7% in the optical recording medium comparative samples #2-6 and #2-7 in which the second recording film contained 90.6 atomic % or more of Al, jitter was lower than about 7% in the optical recording medium samples #2-1 to #2-5 and the optical recording medium comparative samples #2-1 to #2-5 in which the amount of Al contained in the second recording film was equal to less than 82.2 atomic % and the optical recording medium samples #2-1 to #2-5 and the optical recording medium comparative samples #2-1 to #2-5 had good jitter characteristic. In particular, it was found that in the optical recording medium samples #2-3 to #2-5 and the optical recording medium comparative samples #2-1 to #2-4 in which the second recording film contained 26.4 atomic % to 73.6 atomic % of Al, jitter was equal to or less than about 6% and the optical recording medium samples #2-3 to #2-5 and the optical recording medium comparative samples #2-1 to #2-4 had particularly good jitter characteristic.

As shown in FIG. 20, it was found that in the optical recording medium samples #2-1 to #2-5 in which the second recording film contained 0 to 42.7 atomic % of Al and the optical recording medium comparative samples #2-4 to #2-7 in which the second recording film contained 78.6 atomic % to 98.9 atomic % of Al, the modulation was equal to or higher than 50% and in particular, in the optical recording medium sample #2-1 in which the amount of Al contained in the second recording film was 0, the optical recording medium samples #2-3 to #2-5 in which the second recording film contained 26.4 atomic % to 42.7 atomic % of Al and the optical recording medium comparative samples #2-5 to #2-7 in which the second recording film contained 82.2 atomic % to 98.9 atomic % of Al, the modulation was equal to or higher than 60%, i.e., high modulation could be obtained.

Further, a laser beam having a wavelength of 405 nm was projected onto each of the optical recording medium samples #2-1 to #2-5 and the optical recording medium comparative samples #2-1 to #2-7 and the amount of the laser beam transmitted through each sample was measured, thereby measuring light transmittance of each sample.

FIG. 21 shows the relationship between the amount of Al contained in the second recording film and the light transmittance of the sample.

As shown in FIG. 21, it was found that in the optical recording medium samples #2-3 to #2-5 and the optical recording medium comparative sample #2-1 in which the second recording film contained 26.4 atomic % to 52.3 atomic % of Al, the light transmittance was equal to or higher than 50% and that in the case where the second recording film contained 26.4 atomic % to 52.3 atomic % of Al, the light transmittance of the sample became higher.

The present invention has thus been shown and described with reference to specific embodiments and working examples. However, it should be noted that the present invention is in no way limited to the details of the described arrangements but changes and modifications may be made without departing from the scope of the appended claims.

For example, in the embodiment shown in FIG. 8, although the optical recording medium 40 includes the L0 information recording layer 50 and the L1 information recording layer 50 as information recording layers, it is not absolutely necessary for the optical recording medium 40 to include the L0 information recording layer 50 and the L1 information recording layer 60 as information recording layers and the optical recording medium may include three or more information recording layers.

Moreover, in the embodiment shown in FIG. 8, although the L0 information recording layer 50 is constituted by laminating the fourth dielectric film 51, the second L0 recording film 52, the first L0 recording film 53 and the third dielectric film 54 from the side of the support substrate 41, the L0 information recording layer 50 may include a reflective film between the support substrate 11 and the fourth dielectric film 51. In such a case, the reflective film may be formed of Mg, Al, Ti, Cr, Fe, Co, Ni, Cu, Zn, Ge, Ag, Pt, Au and the like, and among these materials, it is preferable to form the reflective film of a metal material having a high reflection characteristic, such as Al, Au, Ag, Cu or alloy containing at least one of these metals, such as alloy of Al and Ti.

Further, in the embodiment shown in FIGS. 1 and 2, although the first recording film 31 and the second recording film 32 of the recording layer 14 are formed in contact with each other it is not absolutely necessary to form the first recording film 31 and the second recording film 32 of the recording layer 14 in contact with each other but it is sufficient for the second recording film 32 to be so located in the vicinity of the first recording film 31 as to enable formation of a mixed region including the primary component element of the first recording film 31 and the primary component element of the second recording film 32 when the region is irradiated with a laser beam. Further, one or more other films such as a dielectric film may be interposed between the first recording film 31 and the second recording film 32.

Furthermore, in the embodiment shown in FIG. 8, although the first L1 recording film 63 and the second L1 recording film 62 of the L1 information recording layer 60 are formed in contact with each other it is not absolutely necessary to form the first L1 recording film 63 and the second L1 recording film 62 of the L1 information recording layer 60 in contact with each other but it is sufficient for the second L1 recording film 62 to be so located in the vicinity of the first L1 recording film 63 as to enable formation of a mixed region including the primary component element of the first L1 recording film 63 and the primary component element of the second L1 recording film 62 when the region is irradiated with a laser beam. Further, one or more other films such as a dielectric film may be interposed between the first L1 recording film 63 and the second L1 recording film 62.

Moreover, in the embodiment shown in FIG. 8, although the first L0 recording film 53 and the second L0 recording film 52 of the L0 information recording layer 50 are formed in contact with each other it is not absolutely necessary to form the first L0 recording film 53 and the second L0 recording film 52 of the L0 information recording layer 50 in contact with each other but it is sufficient for the second L0 recording film 52 to be so located in the vicinity of the first L0 recording film 53 as to enable formation of a mixed region including the primary component element of the first L0 recording film 53 and the primary component element of the second L0 recording film 52 when the region is irradiated with a laser beam. Further, one or more other films such as a dielectric film may be interposed between the first L0 recording film 53 and the second L0 recording film 52.

Further, in the embodiment shown in FIG. 8, although the optical recording medium 40 includes the L0 information recording layer 50, it is not absolutely necessary for the optical recording medium 40 to include the L0 information recording layer 50 and instead of the L0 information recording layer 50, the support substrate 41 or the transparent intermediate layer 42 can be utilized as a recording layer adapted to enable only data reading by forming pits on the surface of the support substrate 41 or the transparent intermediate layer 42 and recording data therein.

Furthermore, in the embodiment shown in FIGS. 1 and 2, although the first recording film 21 of the recording layer 14 contains Si as a primary component, it is not absolutely necessary for the first recording film 21 of the recording layer 14 to contain Si as a primary component and the first recording film 31 of the recording layer 14 may contain an element selected from the group consisting of Ge, C, Sn, Au, Zn and Cu instead of Si.

Moreover, in the embodiment shown in FIG. 8, although each of the first L0 recording film 53 and the first L1 recording film 63 contains Si as a primary component, it is not absolutely necessary for each of the first L0 recording film 53 and the first L1 recording film 63 to contain Si as a primary component and each of the first L0 recording film 53 and the first L1 recording film 63 may contain an element selected from the group consisting of Ge, C, Sn, Au, Zn and Cu instead of Si.

Further, in the embodiment shown in FIGS. 1 and 2, although the first recording film 31 is disposed on the side of the light transmission layer 16 and the second recording film 32 is disposed on the side of the support substrate 11, it is possible to dispose the first recording film 31 on the side of the support substrate 11 and the second recording film 32 on the side of the light transmission layer 16.

Furthermore, in the embodiment shown in FIG. 8, although the first L0 recording film 53 is disposed on the side of the light transmission layer 43 and the second L0 recording film 52 is disposed on the side of the support substrate 41, it is possible to dispose the first L0 recording film 53 on the side of the support substrate 41 and the second L0 recording film 52 on the side of the light transmission layer 43.

Further, in the embodiment shown in FIGS. 1 and 2, although the reflective layer 12 is provided on the support substrate 11, in order to prevent the reflective layer 12 from being corroded, it is possible to form a moisture-proof layer between the support substrate 11 and the reflective layer 12.

Furthermore, in the embodiment shown in FIGS. 1 and 2, although the optical recording medium 10 includes the reflective layer 12 and it is preferable to provide the reflective layer 12 in order to obtain a higher reproduced signal (C/N ratio) by a multiple interference effect, it is not absolutely necessary for the optical recording medium 10 to include the reflective layer 12.

Moreover, in the embodiment shown in FIG. 8, although the L1 information recording layer 60 includes no reflective film, the L1 information recording layer 60 may include a thin reflective film.

Furthermore, the optical recording medium 10 includes the light transmission layer 16 and is constituted so that a laser beam L is projected onto the recording layer 14 via the light transmission layer 16 in the embodiment shown in FIGS. 1 and 2 and the optical recording medium 40 includes the light transmission layer 43 and is constituted so that a laser beam L is projected onto the L0 information recording layer 50 or the L1 information recording layer 60 via the light transmission layer 43 in the embodiment shown in FIG. 8. However, the present invention is not limited to an optical recording medium having such a configuration and the optical recording medium may include a substrate formed of a light transmittable material and be constituted so that a laser beam L is projected onto the recording layer 14 or the L0 information recording layer 50 or the L1 information recording layer 60 via the substrate.

According to the present invention, it is possible to provide an optical recording medium which has an excellent initial recording characteristic and can store recorded data in a good condition over the long term.

What is claimed is:

1. An optical recording medium comprising a substrate and a recording layer in which data can be recorded by projecting a laser beam thereonto, the recording layer including a first recording film containing an element selected from the group consisting of Si, Ge, C, Sn, Au, Zn and Cu as a primary component and a second recording film containing Ti as a primary component.

2. An optical recording medium in accordance with claim 1, wherein the second recording film contains Al as an additive.

3. An optical recording medium in accordance with claim 2, wherein the second recording film contains Al as an additive in an amount equal to or more than 25 atomic % and-less than 50 atomic %.

4. An optical recording medium in accordance with claim 1, which further comprises a first dielectric layer and a second dielectric layer on opposite sides of the recording layer.

5. An optical recording medium in accordance with claim 2, which further comprises a first dielectric layer and a second dielectric layer on opposite sides of the recording layer.

6. An optical recording medium in accordance with claim 3, which further comprises a first dielectric layer and a second dielectric layer on opposite sides of the recording layer.

7. An optical recording medium in accordance with claim 1, which further comprises a light transmission layer having a thickness of 10 to 300 μm on the opposite side to the substrate with respect to the recording layer and one surface of the light transmission layer constitutes a light incidence plane through which the laser beam enters the optical recording medium.

8. An optical recording medium in accordance with claim 2, which further comprises a light transmission layer having a thickness of 10 to 300 μm on the opposite side to the substrate with respect to the recording layer and one surface of the light transmission layer constitutes a light incidence plane through which the laser beam enters the optical recording medium.

9. An optical recording medium in accordance with claim 3, which further comprises a light transmission layer having a thickness of 10 to 300 μm on the opposite side to the substrate with respect to the recording layer and one surface of the light transmission layer constitutes a light incidence plane through which the laser beam enters the optical recording medium.

10. An optical recording medium in accordance with claim 4, which further comprises a light transmission layer having a thickness of 10 to 300 μm on the opposite side to the substrate with respect to the recording layer and one surface of the light transmission layer constitutes a light incidence plane through which the laser beam enters the optical recording medium.

11. An optical recording medium in accordance with claim 5, which further comprises a light transmission layer having a thickness of 10 to 300 μm on the opposite side to the substrate with respect to the recording layer and one surface of the light transmission layer constitutes a light incidence plane through which the laser beam enters the optical recording medium.

12. An optical recording medium in accordance with claim 6, which further comprises a light transmission layer having a thickness of 10 to 300 μm on the opposite side to the substrate with respect to the recording layer and one surface of the light transmission layer constitutes a light incidence plane through which the laser beam enters the optical recording medium.

13. An optical recording medium comprising a substrate and a plurality of information recording layers in which data can be recorded by projecting a laser beam thereonto, at least one information recording layer other than a information recording layer farthest from a light incidence plane through which a laser beam enters including a first recording film containing an element selected from the group consisting of Si, Ge, C, Sn, Au, Zn and Cu as a primary component and a second recording film containing Ti as a primary component.

14. An optical recording medium in accordance with claim 13, wherein the second recording film contains Al as an additive.

15. An optical recording medium in accordance with claim 14, wherein the second recording film contains Al as an additive in an amount equal to or more than 25 atomic % and less than 50 atomic %.

16. An optical recording medium in accordance with claim 13, which further comprises a first dielectric layer and a second dielectric layer on opposite sides of the at least one recording layer.

17. An optical recording medium in accordance with claim 14, which further comprises a first dielectric layer and a second dielectric layer on opposite sides of the at least one recording layer.

18. An optical recording medium in accordance with claim 15, which further comprises a first dielectric layer and a second dielectric layer on opposite sides of the at least one recording layer.

19. An optical recording medium in accordance with claim 13, which further comprises a light transmission layer having a thickness of 10 to 300 μm on the opposite side to the substrate with respect to the plurality of recording layers and one surface of the light transmission layer constitutes a light incidence plane through which the laser beam enters the optical recording medium.

20. An optical recording medium in accordance with claim 14, which further comprises a light transmission layer having a thickness of 10 to 300 μm on the opposite side to the substrate with respect to the plurality of recording layers and one surface of the light transmission layer constitutes a light incidence plane through which the laser beam enters the optical recording medium.

21. An optical recording medium in accordance with claim 15, which further comprises a light transmission layer having a thickness of 10 to 300 μm on the opposite side to the substrate with respect to the plurality of recording layers and one surface of the light transmission layer constitutes a light incidence plane through which the laser beam enters the optical recording medium.

22. An optical recording medium in accordance with claim 16, which further comprises a light transmission layer having a thickness of 10 to 300 μm on the opposite side to the substrate with respect to the plurality of recording layers and one surface of the light transmission layer constitutes a light incidence plane through which the laser beam enters the optical recording medium.

23. An optical recording medium in accordance with claim 17, which further comprises a light transmission layer having a thickness of 10 to 300 μm on the opposite side to the substrate with respect to the plurality of recording layers and one surface of the light transmission layer constitutes a light incidence plane through which the laser beam enters the optical recording medium.

24. An optical recording medium in accordance with claim 18, which further comprises a light transmission layer having a thickness of 10 to 300 μm on the opposite side to the substrate with respect to the plurality of recording layers and one surface of the light transmission layer constitutes a light incidence plane through which the laser beam enters the optical recording medium.

* * * * *